(12) United States Patent
Niwa

(10) Patent No.: US 6,909,279 B2
(45) Date of Patent: Jun. 21, 2005

(54) POSITION SENSOR TO COMPENSATE FOR CHANGE OF TEMPERATURE COEFFICIENT OF IMPEDANCE OF A DETECTION COIL

(75) Inventor: Masahisa Niwa, Takarazuka (JP)

(73) Assignee: Matsushita Electric Works, Ltd., Osaka (JP)

( * ) Notice: Subject to any disclaimer, the term of this patent is extended or adjusted under 35 U.S.C. 154(b) by 220 days.

(21) Appl. No.: 10/344,689
(22) PCT Filed: Jun. 28, 2002
(86) PCT No.: PCT/JP02/06534
  § 371 (c)(1),
  (2), (4) Date: Feb. 24, 2003
(87) PCT Pub. No.: WO03/002947
  PCT Pub. Date: Jan. 9, 2003

(65) Prior Publication Data
US 2003/0173952 A1 Sep. 18, 2003

(30) Foreign Application Priority Data
Jun. 29, 2001 (JP) .................................... 2001-199835

(51) Int. Cl.[7] ................................................ G01B 7/14
(52) U.S. Cl. ............................................... 324/207.16
(58) Field of Search ...................... 324/207.18, 207.19, 324/224, 207.12, 207.16, 207.22, 207.24; 336/45, 130, 179

(56) References Cited

U.S. PATENT DOCUMENTS 4,864,232 A 9/1989 Redlich
5,003,258 A 3/1991 Mancini
5,107,211 A 4/1992 Rose
5,115,193 A 5/1992 Bean et al.
5,898,300 A 4/1999 Heizmann et al.

FOREIGN PATENT DOCUMENTS

JP 4-306890 10/1992
JP 9-33202 2/1997

OTHER PUBLICATIONS

English Language Abstract of JP 9–33202, Feb. 7, 1997.

Primary Examiner—Jay Patidar
Assistant Examiner—Reena Aurora
(74) Attorney, Agent, or Firm—Greenblum & Bernstein, P.L.C.

(57) ABSTRACT

A direct current and an alternate current are simultaneously supplied from a constant current circuit to a detection coil. At least one of the ratio of the direct current to the alternate current, the ratio of an alternate current component to a direct current component of an impedance in a detecting section, a temperature characteristic of the ratio of the direct current to the alternate current, and a temperature characteristic of the ratio of the alternate current component to the direct current component of the impedance of the detecting section is set in such a manner that the margin of fluctuation of a temperature coefficient of a peak value of an output voltage from the detecting section in a whole displacement zone of a core relative to the detection coil is smaller than the margin of fluctuation of a temperature coefficient of the alternate current component of the impedance of the detection coil at the frequency of the alternate current.

44 Claims, 21 Drawing Sheets

| MATERIAL | RESISTIVITY ($\mu \Omega \cdot m$) |
|---|---|
| SOFT MAGNETIC IRON (SUY-0) | 0.1 |
| PERMALLOY (PC) | 0.6 |
| ELECTROMAGNETIC STAINLESS | 0.6 |
| SUS430 | 0.6 |
| IRON CHROME (FCH2) | 1.2 |

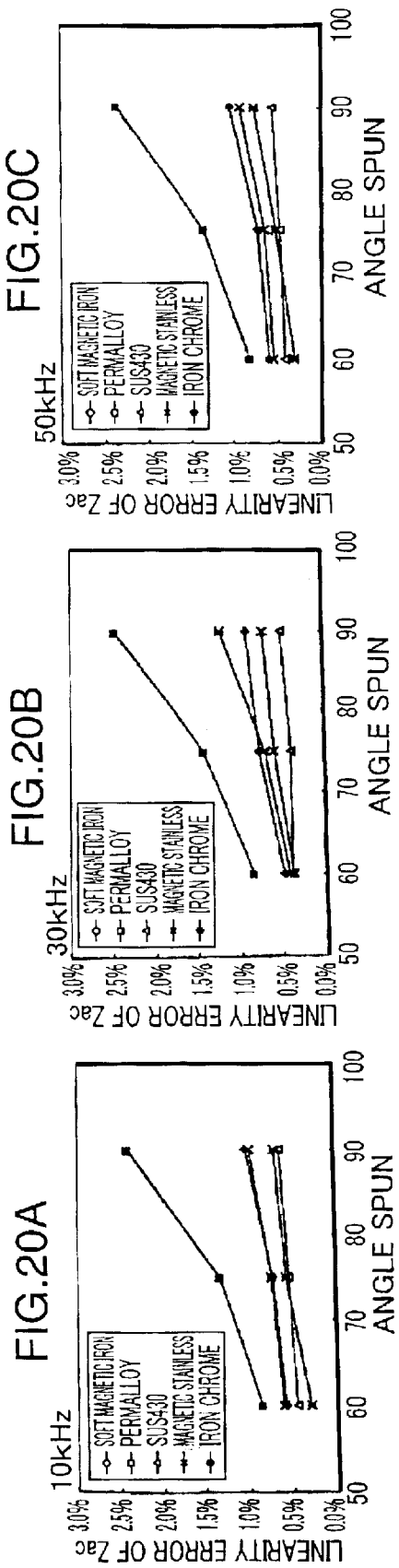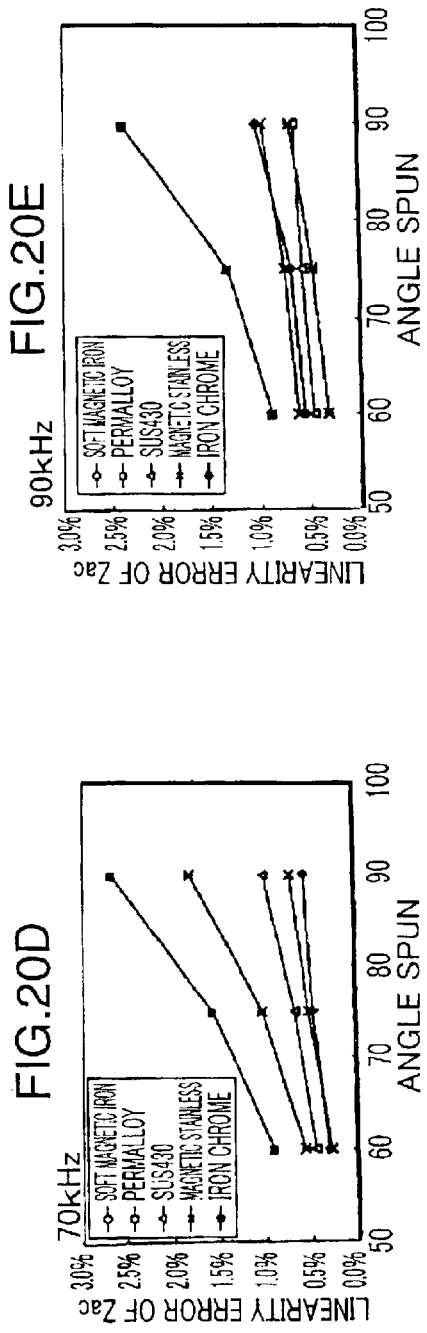

FIG. 28
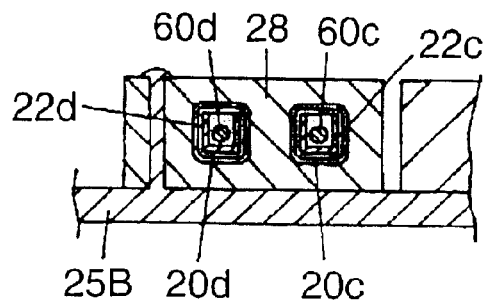
FIG. 29A  Vr
FIG. 29B  Vout
T1  T2
FIG. 30A  Vr
FIG. 30B  Vout
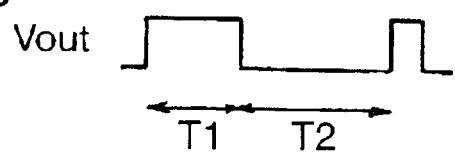
FIG. 31A  Vr
FIG. 31B  Vout

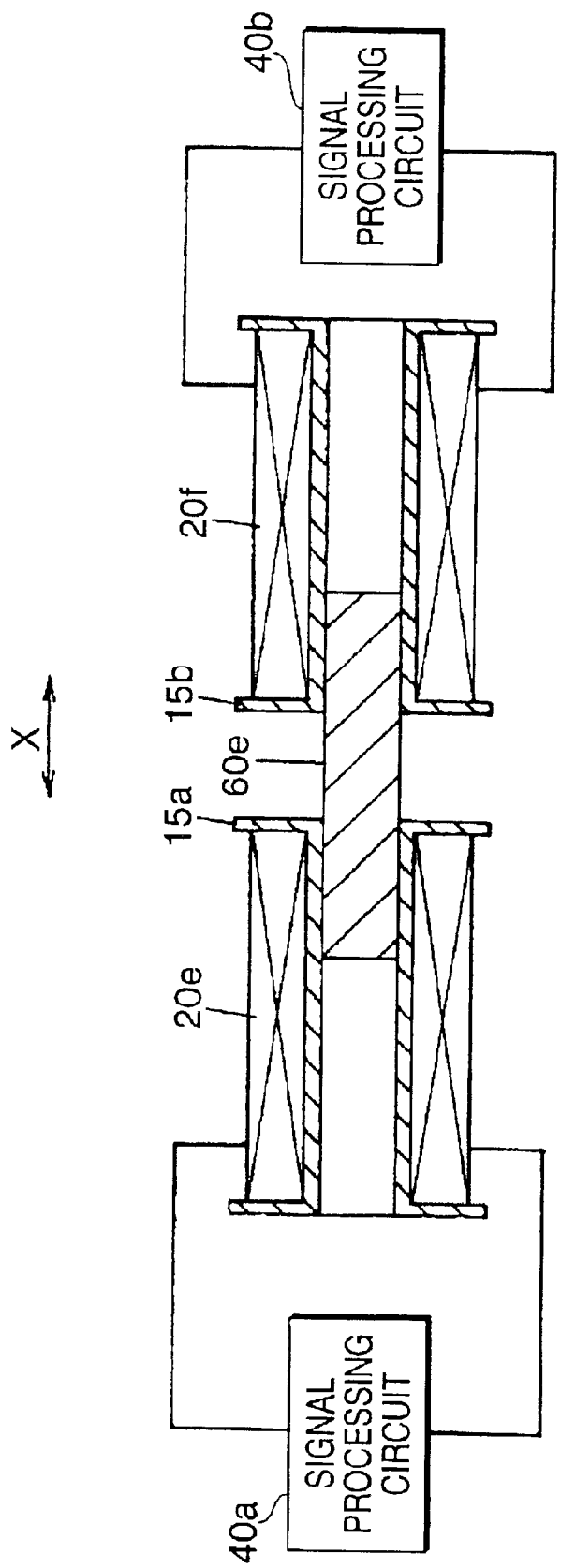

POSITION SENSOR TO COMPENSATE FOR CHANGE OF TEMPERATURE COEFFICIENT OF IMPEDANCE OF A DETECTION COIL

TECHNICAL FIELD

This invention relates to a position sensor for detecting displacement of a movable object.

BACKGROUND ART

Heretofore, there has been proposed a position sensor constructed in such a manner that a core is passed through a detection coil to detect change of impedance of the detection coil and to output a signal indicative of displacement of the core relative to the detection coil. FIG. 34 is a diagram schematically illustrating a detecting section of such a conventional position sensor. FIG. 35 is a graph showing a relation between displacement X of a core and alternate current impedance or AC impedance Zac of a detection coil 2 (sic). FIG. 36 is a diagram showing an entire configuration of the circuit of the position sensor. The AC impedance Zac has a component of a real number and a component of an imaginary number. In FIG. 35, the greater the displacement X is, the more the passing amount of the core 301 through the detection coil 302 is with the result that the AC impedance Zac increases. Alternatively, the position sensor may be configured in such a manner that the greater the displacement X is, the less the passing amount of the core 301 through the detection coil 302 is, so that the AC impedance Zac decreases as the displacement X increases.

In the above-constructed position sensor, generally, an alternate current is supplied to the detection coil 302 to detect an amplitude and a phase of a voltage detected at the opposite ends of the detection coil 302 so as to perform appropriate signal processing. The reason for supplying an alternate current is to obtain a voltage amplitude proportional to the AC impedance Zac of the detection coil 302.

In the case that the core 301 is made of a magnetic material, however, it is known that the temperature change ratio (temperature coefficient) of impedance Z of the detection coil 302 in passing the core 301 through the coil 302 is not uniform relative to the displacement X of the core 301 with the result that the temperature change ratio $\Delta(dZac/dt)$ increases as the passing amount of the core 301 through the coil 302 increases. As a result, it is necessary to compensate for an output voltage of the detection coil 302 in terms of circuit, configuration considering the temperature change, which makes the circuit configuration of the position sensor complicated.

U.S. Pat. No. 5,003,258, No. 4,864,232, No. 5,898,300, etc. propose a technique to solve the above drawbacks. FIG. 38 is a diagram disclosed in U.S. Pat. No. 5,003,258. What is inherently disclosed in these patent publications is an arrangement in which a detection coil 402 is so fabricated as to cancel a temperature change of impedance Z (inductance component) resulting from a magnetic member 421 of a core 401 and a temperature change of impedance Z (eddy current component) resulting from a nonmagnetic member 422 of the core 401.

Specifically, the above prior art proposes a technique of lessening dependency of the temperature coefficient of impedance Z of the detection coil 402 on the displacement X of the core 401 by providing the arrangement of the detection coil 402 and peripheral devices thereof in an attempt to solve the problem that the temperature coefficient of impedance Z depends on the displacement X. However, even in the above arrangement, there have occurred various problems such as increase of the number of parts constituting the position sensor, difficulty in positioning of parts relative to other parts, constraint in designing the detection coil, limited use of a sensor, and rising of cost in producing the sensor due to these reasons.

FIG. 39 is a graph showing a relationship between displacement X of the detection coil 302 and AC impedance Zac of the detection coil 302 shown in FIG. 34 in a state closer to an actual state than the one shown in FIG. 35. In FIG. 39, the AC impedance Zac shows a linear relation to the displacement X at an intermediate part of the stroke. However, the linearity is lost at the opposite ends of the stroke. Particularly, in the case where the passing amount of the core 301 through the detection coil 302 is small, the linearity is remarkably lost. This is considered because a lead end of the core 301 does not contribute to increase of impedance Z of the detection coil 302 as much as the remaining part of the core 301. Such a phenomenon is sometimes called as "end effect".

Normally, the sensor is constructed in such a manner that linearity appears at an intermediate part of the stroke in correspondence to a desired displacement zone. However, desired linearity may not be obtainable for the aforementioned reasons, for example, in the case where the position sensor encounters dimensional constraint.

Next, described are some of the problems regarding the construction which the prior art has suffered from. One measure is proposed in the aspect of shape of the position sensor to improve the linearity of the position sensor. Specifically, there is a technique of increasing the ratio of the sectional area of the core 301 relative to the sectional area of the winding part on a bobbin 315 (see FIG. 34) by reducing the sectional area of the winding part on the bobbin 315 as much as possible. In such a case, it is preferable to set the clearance defined by the core 301 and the inner wall of the bobbin 315 (side surface opposing the through hole) corresponding to the winding part small.

As far as the bobbin 315 is made of a non-metallic material such as plastic, contact of the core 301 with the inner wall of the bobbin 315 does not greatly affect electrical characteristics (coil impedance or the like) of the position sensor. However, it is highly likely that contact of the core 301 with the inner wall of the bobbin 315 may obstruct smooth displacement of the core 301 relative to the detection coil 302, which may cause drawbacks such as deformation of the core 301 and generation of mechanical hysteresis.

In particular, it is highly likely that a rotary position sensor may encounter the aforementioned drawbacks because positioning of a curved core relative to a curved detection coil is difficult, and the core frequently contacts the inner wall of the bobbin.

Further, the rotary position sensor may encounter the following problems relating to coil winding. One of the problems is that uniform winding is difficult because the bobbin is curved. Thereby, a long time may be needed for winding a wire on the curved bobbin. Another problem occurs at the time of winding a wire on the curved bobbin. Specifically, the curvature of the bobbin after winding locally changes compared with the curvature thereof before winding due to a tension force exerted to the bobbin at the time of winding. Thus, smooth passing of the core through the bobbin is obstructed by the varied dimension of the inner wall of the bobbin corresponding to the winding part. In a worst case, displacement of a movable object is disabled on a half way of its displacement.

DISCLOSURE OF THE INVENTION

An object of this invention is to provide a position sensor that enables to compensate for change of a temperature coefficient of impedance of a detection coil relative to displacement of a core with a simplified circuit configuration.

A position sensor according to an aspect of this invention comprises: a constant current circuit for outputting a constant current which is obtained by superposing an alternate current having a given frequency and a given amplitude over a direct current having a given amplitude; a detecting section including at least a detection coil to which said constant current is supplied; a core made of a magnetic material, said core being displaced relative to said detection coil in an axial direction of said detection coil; and a signal processing circuit for outputting a displacement signal indicative of position data of said core relative to said detection coil based on a peak value of an output voltage from said detecting section upon supply of said constant current, wherein at least one of a ratio of the direct current to the alternate current of said constant current, a ratio of an alternate current component to a direct current component of an impedance in said detecting section, a temperature characteristic of the ratio of the direct current to the alternate current of said constant current, and a temperature characteristic of the ratio of the alternate current component to the direct current component of the impedance in said detecting section is set in such a manner that a margin of fluctuation of a temperature coefficient of the peak value of the output voltage from said detecting section in a whole displacement zone of said core relative to said detection coil is smaller than a margin of fluctuation of a temperature coefficient of the alternate current component of the impedance in said detecting section at said given frequency in the whole displacement zone of said core relative to said detection coil.

According to the above arrangement, the detection coil is optimally selected depending on the object for position detection. Further, dependency of temperature coefficient of impedance of the detection coil on displacement of the core is easily reduced by setting a constant on the circuit. Thereby, change of the temperature coefficient of impedance of the detection coil relative to the displacement of the core is compensated for with a simplified circuit configuration.

BRIEF DESCRIPTION OF THE DRAWINGS

FIGS. 20A through 20E are graphs showing a relation between angle spun and linearity of alternate current impedance of a detection coil in the third embodiment of this invention with respect to each frequency;

FIG. 28 is a side view in section showing a part of the second position sensor in the fourth embodiment of this invention;

FIGS. 29A and 29B show a first arrangement of a displacement signal in a fifth embodiment of this invention;

FIGS. 30A and 30B show a second arrangement of the displacement signal in the fifth embodiment of this invention;

FIGS. 31A and 31B show a third arrangement of the displacement signal in the fifth embodiment of this invention;

FIG. 32 is a sectional view showing a construction of a position sensor in accordance with a sixth embodiment of this invention;

BEST MODE FOR CARRYING OUT THE INVENTION

Figure 1:
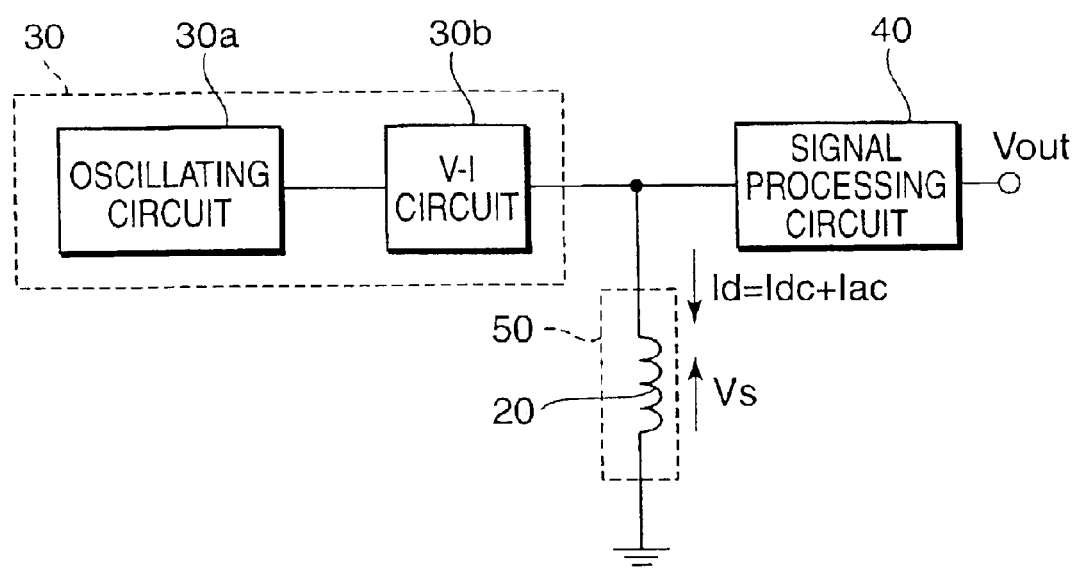
FIG. 1 is a diagram showing a circuit configuration of a position sensor in accordance with a first embodiment of this invention.
Figure 2:
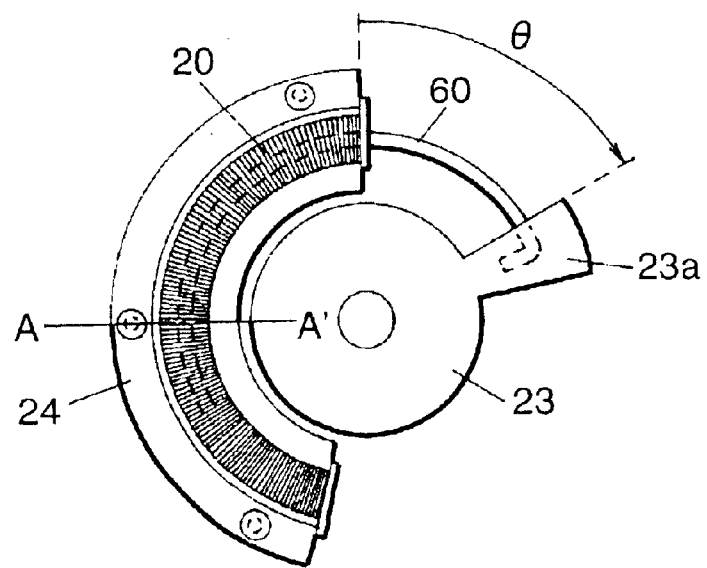
FIG. 2 is a top plan view showing an upper surface of the position sensor in accordance with the first embodiment of this invention.
Figure 3:
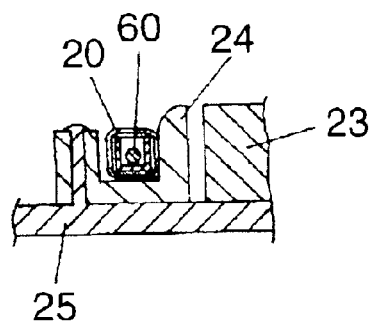
FIG. 3 is a side view in section showing the position sensor in accordance with the first embodiment of this invention.
Figure 4:
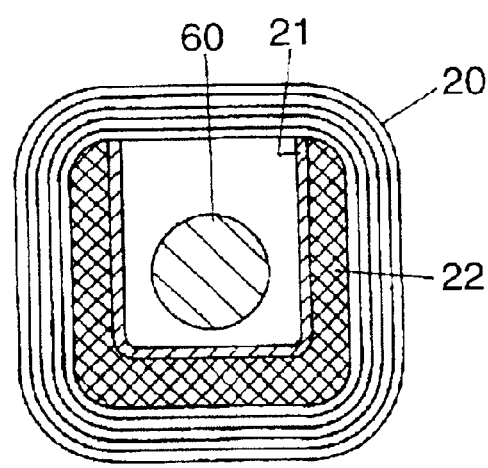
FIG. 4 is a sectional view of a detection coil in the first embodiment of this invention.

Hereinafter, preferred embodiments of this invention are described with reference to the accompanying drawings.
First Embodiment FIG. 1 is a diagram showing a circuit configuration of a position sensor in accordance with the first embodiment of this invention. FIG. 2 is a top plan view of the position sensor. FIG. 3 is a sectional view taken along the line A–A' in FIG. 2. FIG. 4 is a sectional view of a detection coil 20.

The position sensor in accordance with the first embodiment has a generally U-shape in section, and comprises the detection coil 20, a movable block 23, a core 60, a curvature corrector 24, a housing 25, a constant current circuit 30, and a signal processing circuit 40. The detection coil 20 is produced by winding a wire around a curved bobbin 22 which has a given curvature. The curved bobbin 22 has a generally U-shape in section and is applied with a coating 21 on the inner surface of the U-shaped portion thereof. The movable block 23 is a cylindrical body having an axis of rotation coaxial with the center of the curved detection coil 20 with a protrusion 23a formed at an outer part of the cylindrical body. The core 60 is made of a magnetic material and has a fixed curvature. The core 60 is movable in and out through a hollow portion of the detection coil 20 with one end thereof jointed to the protrusion 23a. The curvature corrector 24 corrects a variation of the curvature of the detection coil 20. The housing 25 fixedly mounts the parts at their respective predetermined positions on a surface thereof. The constant current circuit 30 outputs to the detection coil 20 a constant current Id which is obtained by superposing an alternate current of a given frequency f and a given amplitude Iac over a direct current Idc of a given amplitude. The signal processing circuit 40 outputs a displacement signal Vout indicative of positional data of the core 60 relative to the detection coil 20 in accordance with a peak voltage V1 of a voltage Vs (detection signal) which is detected at the opposite ends of the detection coil 20. The peak voltage V1 is determined by a constant current Id outputted from the constant current circuit 30 and impedance Z of the detection coil 20. The detection coil 20 constitutes a detecting section 50 which outputs a detection signal in response to supply of the constant current Id. In this embodiment, the curved bobbin 22 has a generally U-shape in section, which is easily shaped by injection molding or its equivalent. Alternatively, the bobbin may have a configuration other than the U-shape.

The position sensor has such a construction that as the movable block 23 rotates by an angle of rotation θ from 0° to 90°, the passing amount of the core 60 through the detection coil 20 decreases. The constant current circuit 30 includes an oscillating circuit 30a for generating a constant voltage Vd' which is obtained by superposing an alternate-current voltage of a given frequency f and a given amplitude Vac' over a direct-current voltage Vdc' of a given amplitude, and a voltage-to-current converting circuit (V-I circuit) 30b for converting the constant voltage Vd' outputted from the oscillating circuit 30a to a constant current Id.

Now, temperature characteristics of a detection signal from the detecting section 50 is described by taking examples. Normally, in a position sensor, linearity error in output of a detection signal in a certain displacement zone is defined at room temperature, and linearity error in output over a whole operable temperature range is defined by giving a certain margin to the linearity error at room temperature. Let's assume that linearity error of detection signal is ±1% FS or less at room temperature, and ±2% FS or less at a temperature ranging from −40 to +130° C. within a range of an angle of rotation θ=0 to 90° for position detection. In such a case, it is required to suppress tolerance of linearity error due to temperature change within about ±1% FS. If the room temperature is 30° C., difference between the room temperature and the highest temperature reaches 100° C. Supposing that the detection signal changes linearly relative to the temperature change, it is required to suppress the margin of fluctuation of temperature change ratio (temperature coefficient) to ±100 ppm/K or less.

Also, regarding a displacement in a desired displacement zone, a voltage after temperature compensation is settable to a level corresponding to room temperature ±100 ppm/K at the displacement by providing a simple temperature compensation circuit having a constant temperature coefficient, as long as the margin of fluctuation $\Delta(dV1/dT)$ of the temperature coefficient of the peak voltage V1 of the voltage Vs detected at the both ends of the detection coil 20 is not larger than ±100 ppm/K This is what the first embodiment of the invention aims at.

Next, an operation of the first embodiment is described. As shown in FIG. 1, an alternate current Iac and a direct current Idc are simultaneously supplied from the constant current circuit 30 to the detection coil 20. Suppose DC resistance of the detection coil 20 is Zdc, AC impedance of the detection coil at an oscillation frequency f is Zac, and a voltage detected at the opposite ends of the detection coil 20 is Vs, then, the voltage Vs is a sum of a direct-current voltage Vdc and an alternate-current voltage Vac, and is expressed by the following equation (1):

$$Vs = Vdc + Vac = Idc \times Zdc + Iac \times Zac \qquad (1)$$

In equation (1), the variables each are a complex number. However, considering the peak voltage V1 of the voltage Vs, the peak voltage V1 is expressed by the following equation (2):

$$V1 = Vdc + Vac = Idc \times Zdc + Iac \times Zac \quad (2)$$

Figure 5:
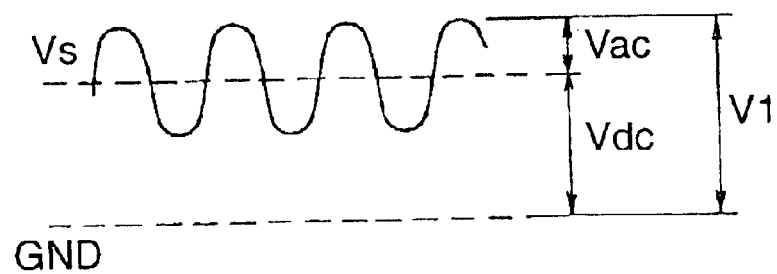
FIG. 5 is a graph showing a waveform of a voltage detected at the opposite ends of the detection coil in the first embodiment of this invention.

In equation (2), the variables each can be handled as a real number. The waveform representing the voltage Vs is expressed by a sum of a DC voltage Vdc and an AC voltage Vac within the peak voltage V1, as shown in FIG. 5.

Figure 6:
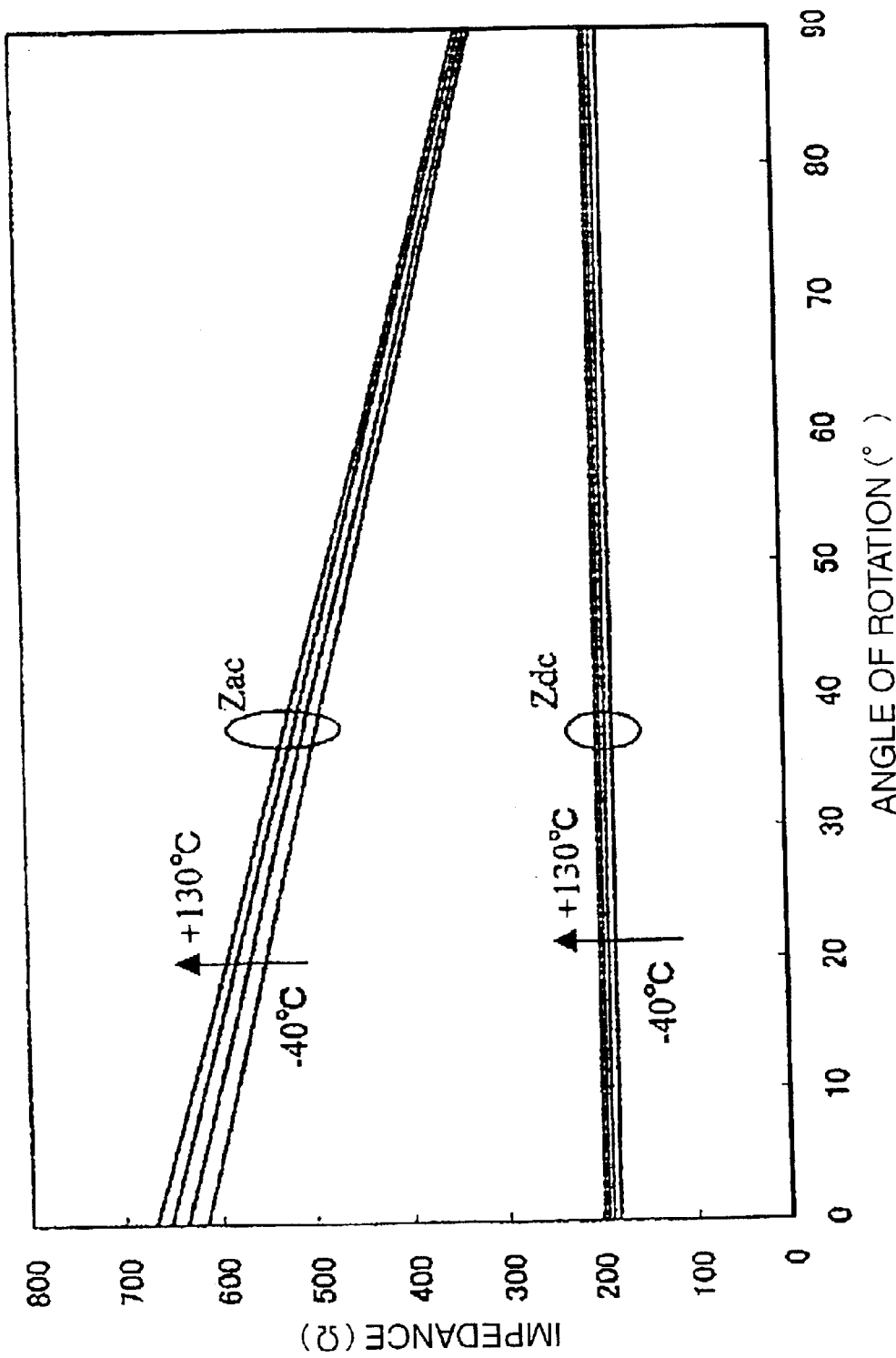
FIG. 6 is a graph showing a relation between angle of rotation and impedance of the detection coil in the first embodiment of this invention.

FIG. 6 is a graph showing sample data that has been created based on actual measurements of impedance of a detection coil 20 produced by winding a copper-nickel alloy wire (GCN15 wire), wherein the DC resistance Zdc and the AC impedance Zac of the detection coil 20 are plotted respectively by setting the angle of rotation θ shown in FIG. 2 as axis of abscissa. In FIG. 6, impedance Z is completely linearly changed relative to the angle of rotation θ. What is shown in FIG. 6 is closely similar to the actual measurements. In FIG. 6, data on the DC resistance Zdc and the AC impedance Zac are shown at respective ambient temperatures: −40° C., +25° C., +85° C., +130° C.

At the ambient temperature of +25° C., the DC resistance Zdc is 188Ω, and the temperature coefficient is 511 ppm/K. Then, AC impedance Zac is expressed by the equation (3):

$$Zac = (Z0 + Z' \times \theta) \times \{1 + (\beta 0 + \beta' \times \theta) \times T\} \quad (3)$$

In the above equation, Z0=636 Ω, Z'=−3.48 Ω/deg, β0=478 ppm/K, β'=−2.49 ppm/K/deg, where θ is an angle of rotation, and T is a degree C of ambient temperature. Here, the temperature coefficient of AC impedance Zac is 478 ppm/K at θ=0°, and 254 ppm/K at θ=90°. In this case, the margin of fluctuation Δ (dZac/dT) reaches 224 ppm/K.

Figure 7:
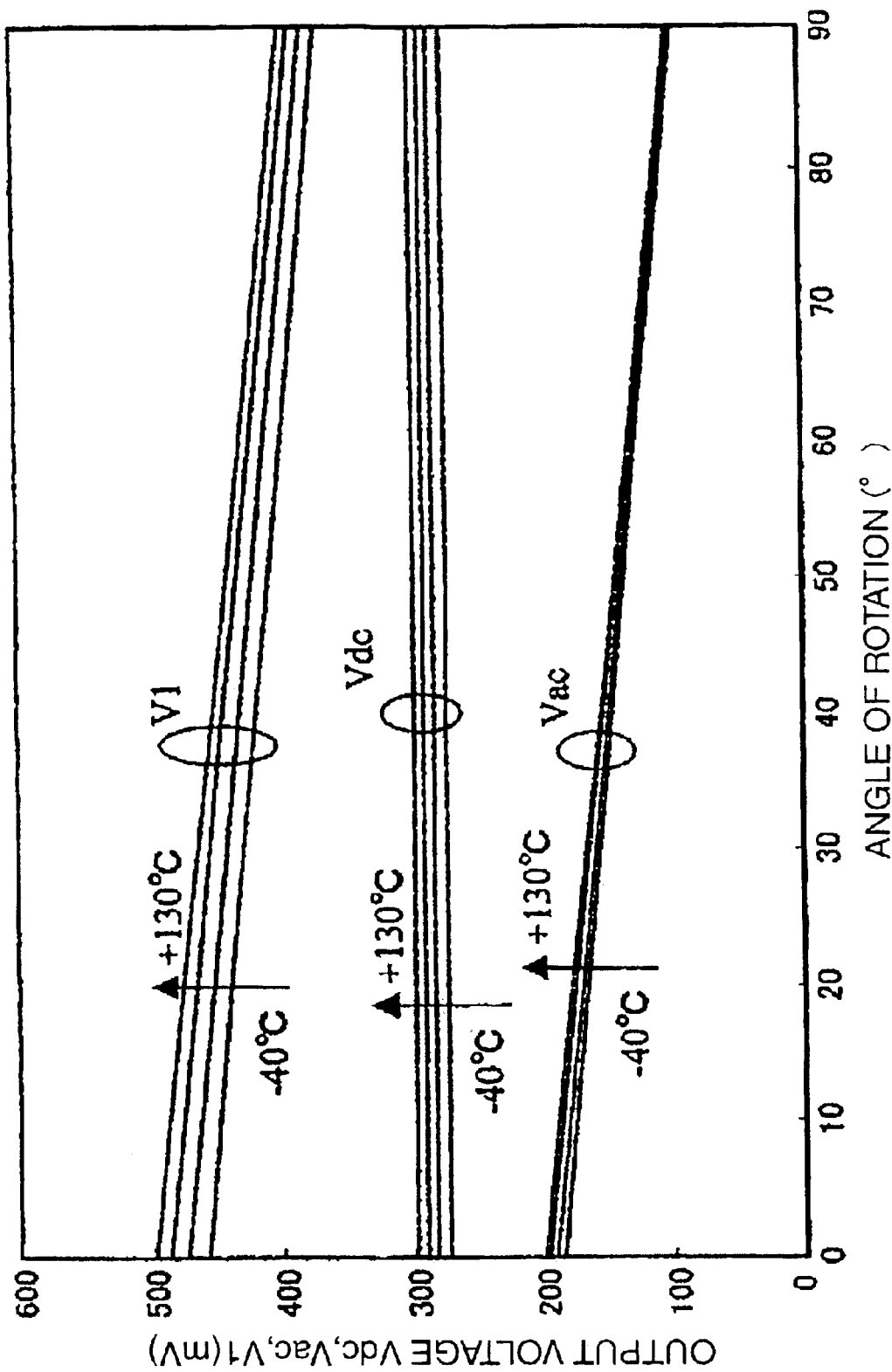
FIG. 7 is a graph showing a relation between angle of rotation and output voltage detected at the opposite ends of the detection coil in the first embodiment of this invention.

Next, the DC voltage Vdc detected at the opposite ends of the detection coil 20, the AC voltage Vac, and the peak voltage V1 of the voltage Vs detected at the opposite ends of the detection coil 20 are plotted based on the equation (2) by setting Idc=1.5 mA, Iac=0.3 mA, where Idc and Iac are direct current and alternate current respectively outputted from the constant current circuit 30. For sake of easy calculation, the temperature change ratio of direct current Idc, alternate current Iac, and frequency f is assumed to be zero. The results of plotting are shown in FIG. 7. The temperature coefficients of these factors are shown in FIG. 8.

Figure 8:
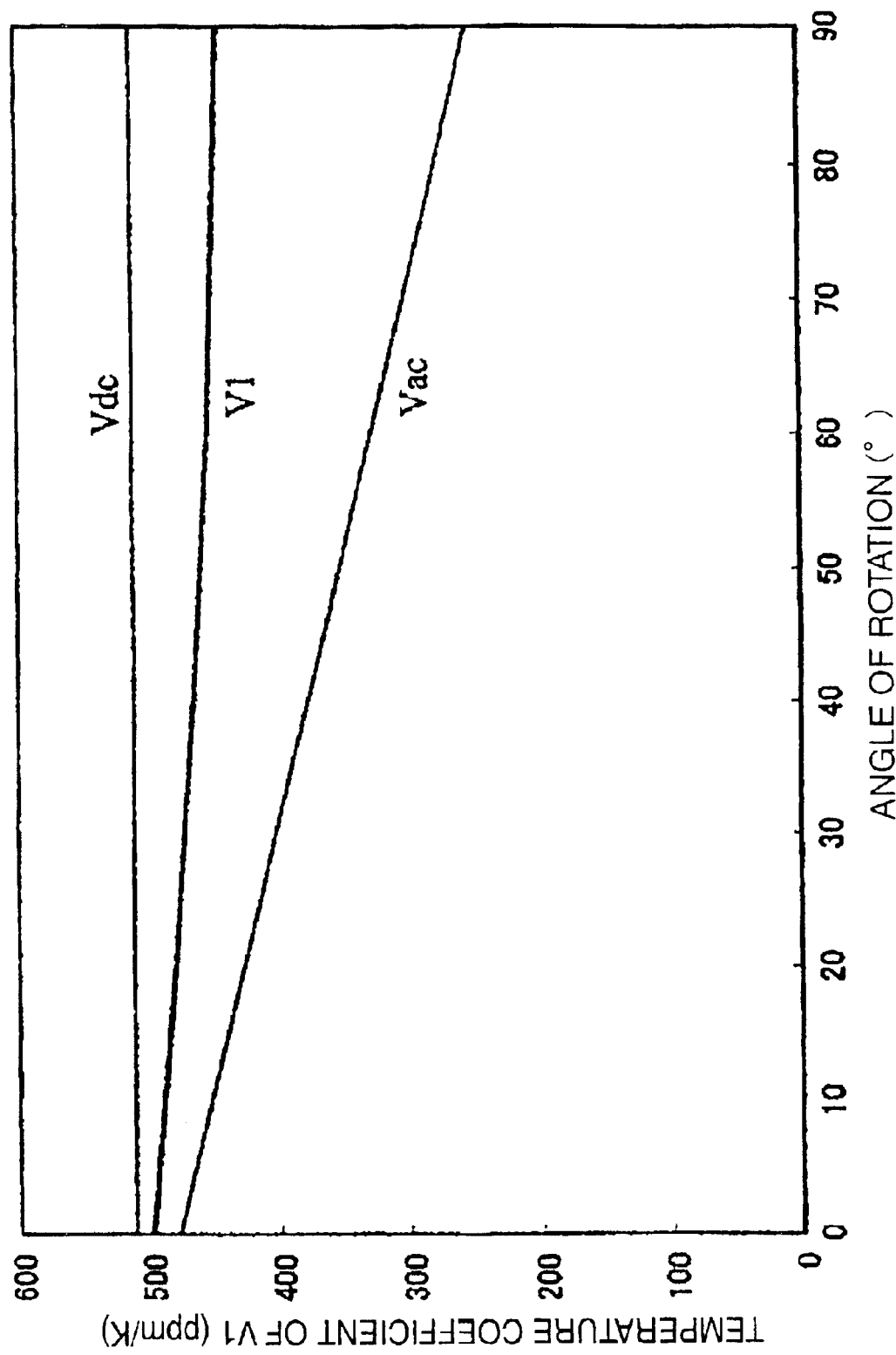
FIG. 8 is a graph showing a relation between angle of rotation and temperature coefficient of output voltage detected at the opposite ends of the detection coil in the first embodiment of this invention.

As is obvious from FIG. 8, the temperature coefficient of the peak voltage V1 ranges from about 450 to 500 ppm/K within the angle of rotation θ=0° to 90°. The margin of fluctuation Δ(dV1/dT) is substantially 50 ppm/K, which is a very narrow margin. Accordingly, it is considered that performing temperature compensation with respect to a peak voltage V1 at about 470 ppm/K enables to return the voltage after the compensation to a value corresponding to room temperature substantially without detection error.

Figure 9:
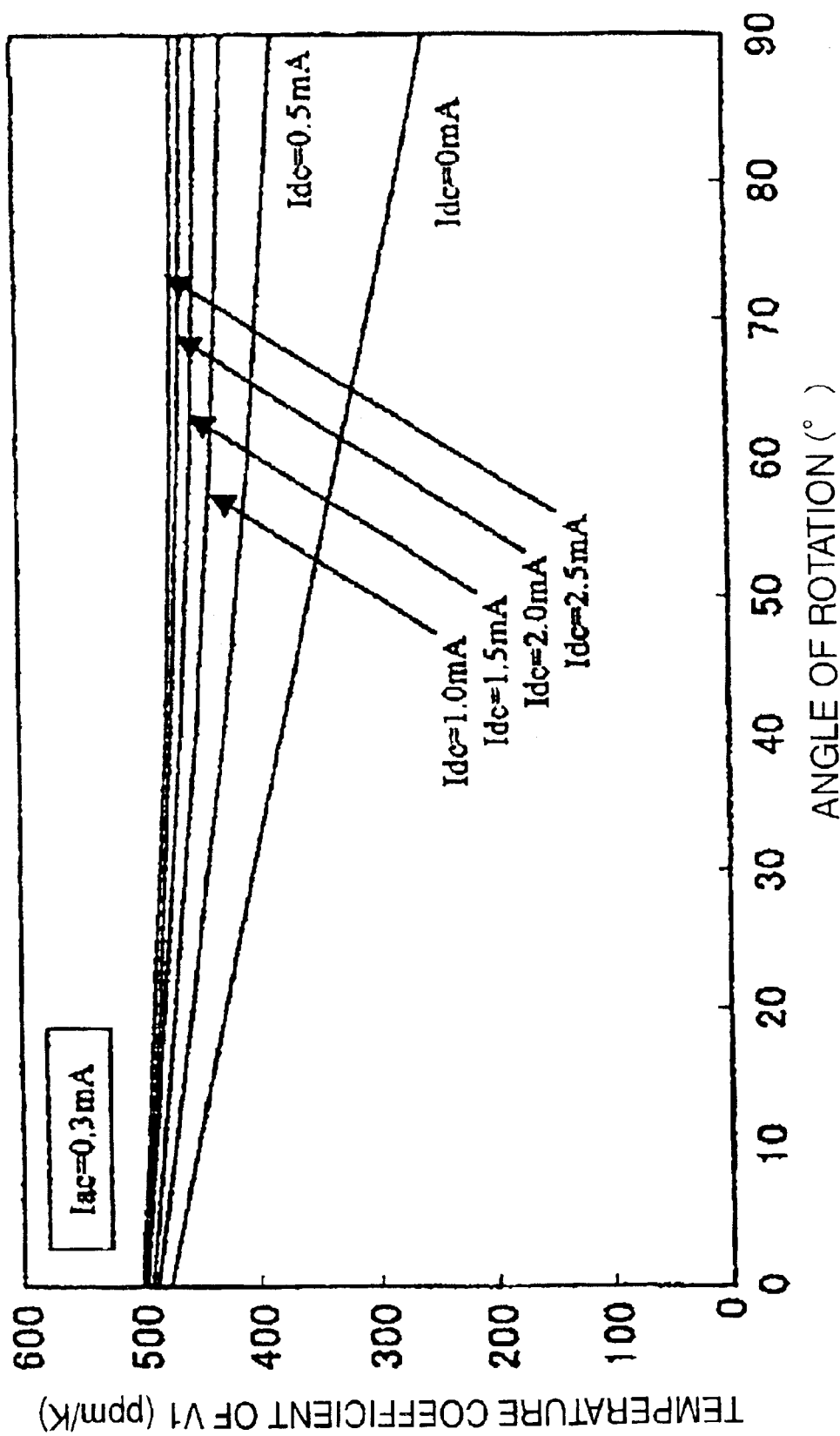
FIG. 9 is a graph showing a relation between angle of rotation and temperature coefficient of peak voltage detected at the opposite ends of the detection coil in the first embodiment of this invention.

Next, the result of calculating the temperature coefficient of the peak voltage V1 in a similar manner as in FIG. 8 is shown in FIG. 9. In FIG. 9, the direct current Idc outputted from the constant current circuit 30 is changed stepwise while keeping the alternate current Iac=0.3 mA. In the case of direct current Idc=0 mA, dependency of the temperature coefficient of the peak voltage V1 on displacement is identical to that of impedance Z of the detection coil 20 on displacement. However, as the direct current Idc increases, the temperature coefficient of the peak voltage V1 is closer to the temperature coefficient of the DC voltage Vdc. Further, as the passing amount of the core 60 through the detection coil 20 decreases (in this embodiment, in the displacement zone where the angle of rotation θ is large), the peak voltage V1 is liable to be affected by the DC voltage Vdc because the ratio of the DC voltage Vdc in the peak voltage V1 is large (see FIG. 7).

The margin of fluctuation Δ(dV1/dT) of the temperature coefficient of the peak voltage V1 is considerably reduced by adding direct current Idc even with a small quantity, compared with the case that direct current Idc=0. The margin of fluctuation Δ(dV1/dT) of the temperature coefficient of the peak voltage V1 is reduced by increasing the quantity of the direct current Idc to be added. However, no further improvement cannot be expected when the quantity of the direct current Idc to be added reaches a certain level. Namely, increasing the quantity of the direct current Idc to be added may raise electric current consumption. In view of this, it is appropriate to select a proper value of direct current Idc considering the allowable current consumption and margin of fluctuation Δ(dV1/dT) of the temperature coefficient of the peak voltage V1. In this case, the ratio of direct current Idc to alternate current Iac in the constant current Id is settable by setting a DC voltage Vdc' and an AC voltage Vac' both of which are generated from the oscillating circuit 30a at an appropriate level, individually.

Also, the ratio of AC voltage Vac to DC voltage Vdc increases as the frequency f of the AC voltage Vac' generated from the oscillating circuit 30a increases. Accordingly, the ratio of Vac to Vdc can be optimally set by properly selecting the frequency f based on a theory similar to the theory developed in the above case.

In the above section, described is the case that the respective temperature change ratios of direct current Idc, alternate current Iac, and frequency f are each set at zero. In the case that these factors have a certain temperature coefficient, the respective temperature coefficients of DC voltage Vdc and AC voltage Vac shown in FIG. 8 are shifted up and down with the result that the temperature characteristic of the peak voltage V1 may change depending on the shifting.

As is obvious from FIGS. 8 and 9, in the case that the passing amount of the core 60 is small, the value of (dV1/dT) is greatly affected by the value of (dVdc/dT). On the other hand, in the case that the passing amount of the core 60 is large, the value of (dV1/dT) is greatly affected by the value of (dVac/dT). This is naturally concluded based on the composition ratio of DC voltage Vdc and AC voltage Vac in the peak voltage V1. It should be noted that the value of (dV1/dT) lies between the value of (dVdc/dT) and the value of (dVac/dT) irrespective of the passing amount of the core 60.

Further, if the circuit is so configured that the value of (dVdc/dT) and the value of (dVac/dT) in the case where the passing amount of the core 60 is large (in this embodiment, in vicinity of the angle of rotation θ=0°) is closer to each other as much as possible, the value of (dV1/dT) is closer to the value of (dVdc/dT) both in the case where the passing amount of the core 60 is large (in this case, DC voltage Vdc and AC voltage Vac are close to each other, although the sensor is liable to be affected by the temperature coefficient of AC voltage Vac) and in the case that the passing amount of the core 60 is small (in this case, the sensor is inherently liable to be affected by the temperature coefficient of DC voltage Vdc). In any case, this arrangement makes it possible to minimize the margin of fluctuation Δ(dV1/dT) of the temperature coefficient of the peak voltage V1.

Furthermore, comparing the case that the value of (dVdc/dT) is closer to the value of (dVac/dT) in the case that the passing amount of the core 60 is minimal, and the case that the value of (dVdc/dT) is closer to the value of (dVac/dT) in the case that the passing amount of the core 60 is maximal, it can be said that the latter arrangement enables to minimize the margin of fluctuation $\Delta(dV1/dT)$ of the temperature coefficient of the peak voltage V1.

Specifically, the values (dVdc/dT) and (dVac/dT) are controlled by setting the respective temperature coefficients of DC resistance Zdc, AC impedance Zac, direct current Idc, alternate current Iac, and frequency f at an appropriate value in accordance with a method which will be described later.

The temperature coefficient of DC resistance Zdc is determined depending on the kind of wire material of the detection coil 20. Preferable and practical wire material of the detection coil 20 includes nichrome wire, manganin wire, wire of copper-nickel alloy (GCN wire), in addition to ordinary copper wire. Ordinary copper wire has such characteristics that the value of the volume resistivity thereof is small despite the fact that the temperature coefficient of the volume resistivity thereof is large. The wires other than the ordinary copper wire have such characteristics that the temperature coefficient of the volume resistivity thereof is small despite the fact that the value of the volume resistivity thereof is large. In case of copper-nickel alloy wire, the volume resistivity and the temperature coefficient thereof are selectable based on the mixing ratio of copper and nickel.

Figure 10:
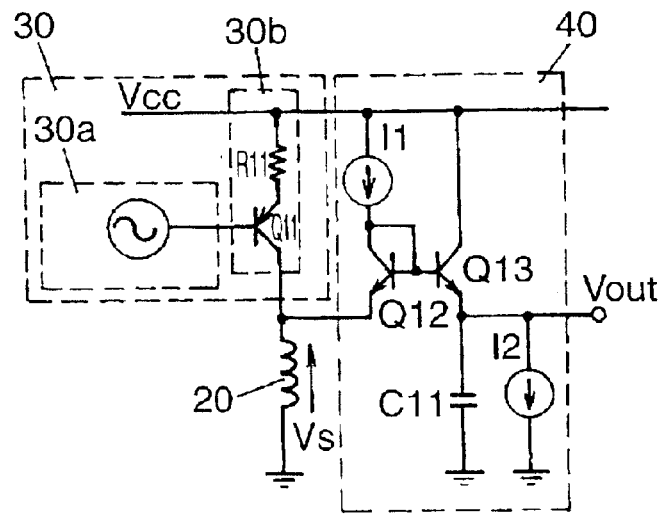
FIG. 10 is a diagram showing an example of a circuit configuration of a constant current circuit and a signal processing circuit in the first embodiment of this invention.

Next, described is a method for giving an appropriate temperature coefficient to direct current Idc, alternate current Iac, and frequency f. The constant current circuit 30 comprises, as shown in FIG. 10, the oscillating circuit 30a for outputting a voltage Vdc'±Vac', and the voltage-current converting circuit (V-I circuit) 30b. The V-I circuit 30b is comprised of a resistance R11 having one end connected to a control power source Vcc, and a PNP transistor Q11 having an emitter connected to the other end of the resistance R11, a base connected to the oscillating circuit 30a, and a collector connected to the detection coil 20. In this embodiment, a peak-hold-type rectifying circuit is employed as the signal processing circuit 40 to extract a peak voltage V1. The signal processing circuit 40 is comprised of a constant current source I1, an PNP transistor Q12, an NPN transistor Q13, and a parallel circuit. The constant current source I1 has one end connected to the control power source Vcc. The NPN transistor Q12 is such that a collector is connected to the opposite end of the constant current source I1, a base and the collector are connected with each other, and an emitter is connected to the detection coil 20. The NPN transistor Q13 has a collector connected to the control power source Vcc, and a base connected to the base of the transistor Q12. The parallel circuit is comprised of a capacitor C11 and a constant current source 12 arranged side by side. The capacitor C11 is connected between an emitter of the transistor Q13 and the ground. A voltage detected at the opposite ends of the capacitor C11 becomes a peak voltage V1 by rectifying the voltage Vs detected at the opposite ends of the detection coil 20 and peak-holding the rectified voltage. The peak voltage V1 is outputted as a displacement signal Vout.

Figure 11:
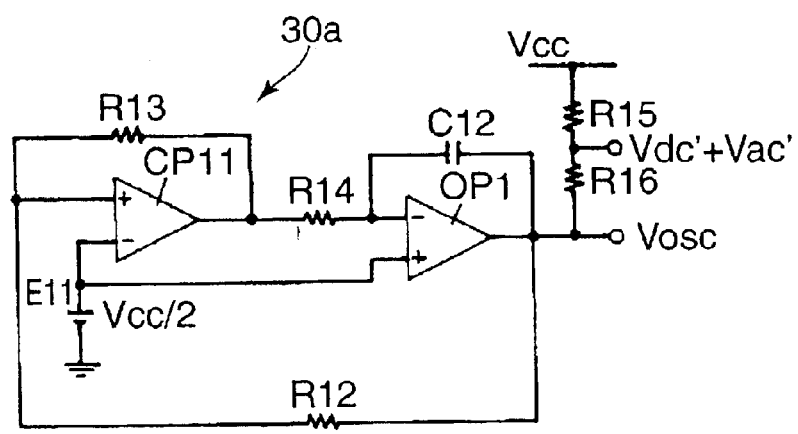
FIG. 11 is a diagram showing an example of a circuit configuration of an oscillating circuit in the first embodiment of this invention.

The oscillating circuit 30a for outputting the voltage Vdc'±Vac' is comprised of, as shown in FIG. 11, a comparator CP11, a resistance R13, a direct-current power source E11, a resistance R14, an operational amplifier OP1, a capacitor C12, a resistance R12, and a series circuit. The resistance R13 is connected between a non-inverting input terminal and an output terminal of the comparator CP11. The direct-current power source E11 is connected between an inverting input terminal of the comparator CP11 and the ground to output a voltage Vcc/2. The resistance R14 has one end connected to the output terminal of the comparator CP11. The operational amplifier OP1 has an inverting input terminal connected to the other end of the resistance R14, and a non-inverting input terminal connected to the direct-current power source E11. The capacitor C12 is connected between the inverting input terminal and an output terminal of the operational amplifier OP1. The resistance R12 is connected between the output terminal of the operational amplifier OP1 and the non-inverting input terminal of the comparator C11. The series circuit is comprised of resistances R15 and R16 connected in series between the output terminal of the operational amplifier OP1 and the control power source Vcc.

In the thus-constructed oscillating circuit 30a, an output Vosc of the operational amplifier OP1 becomes a chopping wave whose offset center is Vcc/2. The DC voltage Vdc' and the AC voltage Vac' are determined by dividing the output Vosc by the resistances R15, and R16, respectively. The oscillating circuit of generating a chopping wave provides a stable circuit against temperature change with a simplified construction, compared with an oscillating circuit of generating a pure sinusoidal wave by analog circuit technology. An oscillating circuit of generating a square wave also provides a stable circuit at a low cost. However, even if a square wave current is supplied to the detection coil 20, what is generated from the detection coil 20 is merely a signal voltage that is uncontrollable due to di/dt of the square wave current. A square wave current is unusable for the above reason. In view of the above, a chopping wave securely provides an output voltage that reflects the angle of rotation $\theta$ of the core in the similar manner as a sinusoidal wave.

In FIG. 11, the oscillating frequency f of the AC voltage Vac' is proportional to $(R13/(C12 \times R14 \times R12))$, and the amplitude thereof is proportional to $(R12/R13)$. Therefore, the value of DC voltage Vdc' and AC voltage Vac' and respective temperature coefficients thereof can be controlled by appropriately selecting the values of the resistances R12 through R16, and the capacitor C12, as well as respective temperature coefficients thereof. In particular, it is often the case that the capacitor C12 is attached to the sensor as an external element even if the constant current circuit 30 in its entirety is a monolithic integrated circuit. In this sense, a method of regulating the temperature coefficient in the capacitor C12 is effective.

Further, in the case that the entirety of the constant current circuit 30 is configured into a monolithic integrated circuit, it may be possible to give an appropriate temperature coefficient to the direct current Idc, alternate current Iac, and frequency f by digitally trimming part or all of the values of the resistances R12 through R16. Thereby, the sensor is usable without substituting an IC even if the core 60, the detection coil 20, the displacement zone, etc. are changed, thus providing multiple use as the sensor.

Digital trimming is adjustment of resistance which is performed by connecting a parallel circuit of a resistance and a switching element in parallel with a resistance to be trimmed (regulated) in advance and by turning on and off the switching element based on digital data. Specifically, digital trimming is performed in such a manner that an optimal code of digital data is determined by monitoring electric characteristics of the circuit, and the optimal code is given to the IC by writing the determined optimal code in an ROM of the IC or by melting off a fuse of the circuit for storing data in the IC. In this way, the resistance in the IC is set at a value corresponding to the optimal code.

Alternatively, the chopping wave generating circuit may have a circuit configuration other than the circuit configuration shown in FIG. 11. In the V-I circuit 30b shown in FIG.

10, the direct current Idc to be supplied to the detection coil 20 has a positive temperature coefficient even if the temperature coefficient of the DC voltage Vdc' generated from the oscillating circuit 30a is zero owing to the temperature characteristic of a voltage Vbe generated between the base and the emitter of the transistor Q11.

Figure 12:
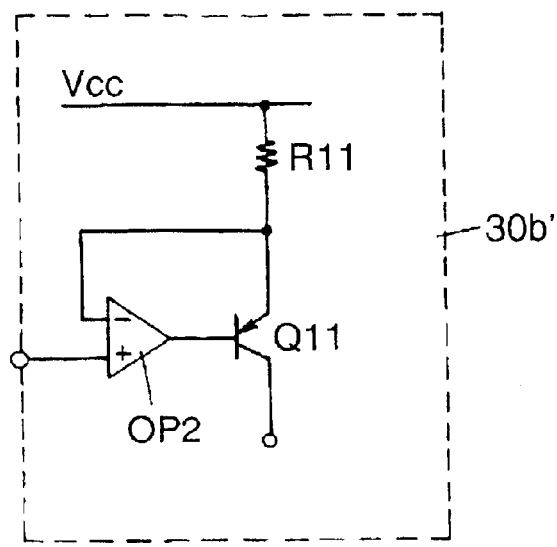
FIG. 12 is a diagram showing an altered circuit configuration of a voltage-current converting circuit in the first embodiment of this invention.

In the case where it is undesirable to give a positive temperature coefficient to the direct current Idc, it may be preferable to use a V-I circuit 30b' shown in FIG. 12. In FIG. 12, additionally provided is an operational amplifier OP2 having an inverting input terminal connected to the emitter of the transistor Q11 of the V-I circuit 30b shown in FIG. 10 and an output terminal connected to the base of the transistor Q11 to connect output from the oscillating circuit 30a to a non-inverting input terminal of the operational amplifier OP2.

Figure 13:
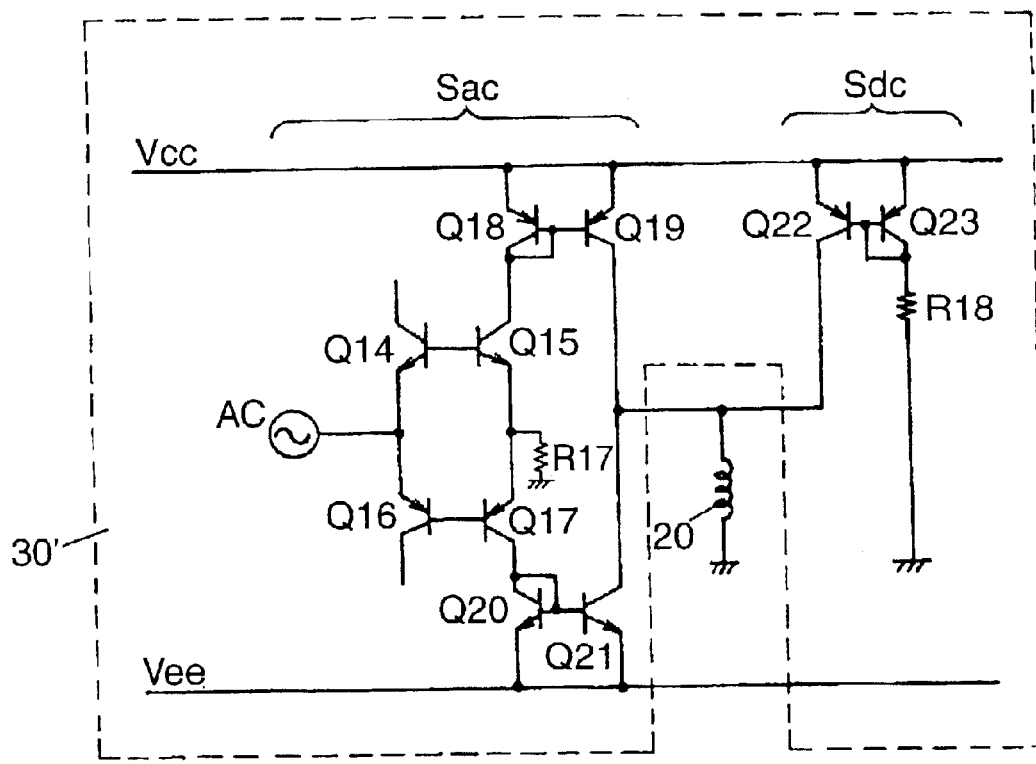
FIG. 13 is a diagram showing an altered circuit configuration of the constant current circuit in the first embodiment of this invention.

FIG. 13 shows a circuit configuration of a constant current circuit 30' which is different from the constant current circuit 30 shown in FIG. 10. The constant current circuit 30' is comprised of an alternate current supply circuit Sac and a direct current supply circuit Sdc. The AC supply circuit Sac is comprised of a series circuit in which an NPN transistor Q14 and a PNP transistor Q16 are connected in series, an alternate current signal source AC which is connected to a connecting midpoint of the transistors Q14 and Q16, a PNP transistor Q18 which is connected between control power sources Vcc-Vee, a series circuit in which NPN transistor Q15, PNP transistor Q17, and NPN transistor Q20 are connected in series, a resistance R17 which is connected to a connecting midpoint of the transistors Q15 and Q17, and a series circuit in which a PNP transistor Q19 and an NPN transistor Q21 are connected in series. Gates of the transistors Q14 and Q15, the transistors Q16 and Q17, the transistors Q18 and Q19, the transistors Q20, and Q21 are connected with each other, respectively. Emitters of the transistors Q14 and Q16, and emitters of the transistors Q15 and Q17 are connected with each other, respectively. The transistors Q14, Q16, Q18, Q20 are short-circuited between respective bases and emitters thereof.

In the above arrangement, the transistors Q14, Q15, Q16, Q17 are a part of an output circuit of a general arithmetic amplification circuit, wherein the alternate current signal source AC is regarded as an input of the circuit and the resistance R17 is regarded as a load resistance thereof. The output circuit is configured in such a manner that a current flowing through the load by way of the transistors Q15, Q17 serving as an output is copied by a current mirror comprising the transistors Q18, Q19, and the transistors Q20, Q21 to give the copied current to the detection coil 20. In this case, desired temperature characteristics are settable with respect to the alternate current Iac by giving an appropriate temperature coefficient to the amplitude and frequency of the alternate current signal source AC, and to the resistance R17.

The DC supply circuit Sdc is comprised of PNP transistors Q22, Q23 each having a collector connected to a connecting midpoint of the transistors Q19 and Q21 and an emitter connected to the control power source Vcc, and a resistance R18 which is connected between the collector of the transistor Q23 and the ground. Gates of the transistors Q22, Q23 are connected to each other. The transistor Q23 is short-circuited between the base and the collector thereof In the above example, the circuit is so configured as to supply a positive direct current. In the case that it is appropriate to supply a negative direct current depending on the specifications of the coil and the frequency, the polarity of the transistors Q22, Q23 may be of an NPN type, and the respective emitters of the transistors Q22, Q23 may be connected to the control power source Vee. In such an altered arrangement, desired temperature characteristics are settable with respect to the direct current Idc by giving an appropriate temperature coefficient to the resistance R18. As a further altered arrangement, one end of the resistance R18 may be connected to a predetermined electric potential in place of the ground. In such an altered arrangement, desired temperature characteristics are settable with respect to the direct current Idc by giving an appropriate temperature coefficient to the potential.

The detection coil 20 has one end connected to a connecting midpoint of the transistors Q19 and Q22. The AC supply circuit Sac for supplying an alternate current Iac and the DC supply circuit Sdc for supplying a direct current Idc are provided independently of each other. Thereby, the ratio of the alternate current Iac to the direct current Idc and respective temperature coefficients thereof can be controlled in a simplified manner. Further, such a control may be performed by digital trimming.

The signal processing circuit 40 may include an amplifier having a temperature coefficient of opposite polarity to the temperature coefficient of the peak voltage V1 of the output voltage outputted from the detecting section 50, so that a displacement signal Vout may be outputted based on an output of the amplifier. With such an altered arrangement, a displacement signal which has already been applied with a temperature compensation is obtainable by processing the output from the amplifier because the output from the amplifier is a signal merely depending on the displacement after the temperature compensation.

Figure 14:
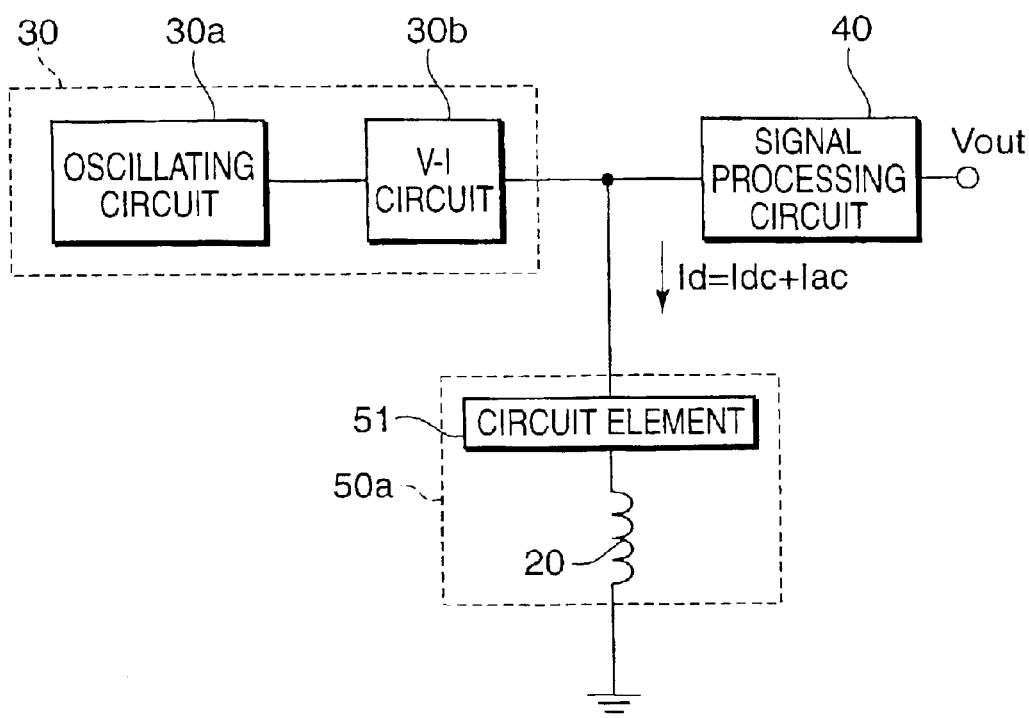
FIG. 14 is a diagram showing an altered circuit configuration in the first embodiment of this invention.

According to the embodiment of this invention, not only regulation of the constant current circuit 30 but also controlling of the values of DC resistance Zdc and AC impedance Zac and respective temperature coefficient thereof are accomplished. Specifically, in place of providing the detecting section 50 which has been described with reference to FIG. 1, a detecting section 50a shown in FIG. 14 may be employed. The detecting section 50a includes a circuit element 51 having a DC resistance Zdc' and an AC impedance Zac' in series with the detection coil 20. The DC resistance Zdc' and the AC impedance Zac' of the circuit element 51 have no relation to the angle of rotation θ of the core 60. Therefore, a peak value of a voltage detected at the opposite ends of the detecting section 50a and a temperature coefficient thereof can be controlled by appropriately selecting the values of the DC resistance Zdc' and the AC impedance Zac' and respective temperature coefficient thereof.

For instance, if the circuit element 51 is a pure resistance, the AC impedance Zac' becomes R (resistance value). Further, if the circuit element 51 is an inductance, the circuit element 51 has both the factors of DC resistance Zdc' and AC impedance Zac'. Furthermore, a diode may be provided as the circuit element 51. An influence of providing the diode appears merely on a direct current component Vdc of a voltage Vs detected at the opposite ends of the detection coil 20.

As mentioned above, the margin of fluctuation $\Delta(dV1/dT)$ of the temperature coefficient of a signal voltage in a displacement zone (angle of rotation θ) can be significantly reduced by supplying not only an alternate current Iac but also a direct current Idc to the detection coil 20. However, it is obvious that a small value of $\Delta(dZac/dT)$ itself reduces the value of $\Delta(dV1/dT)$. The U.S. patent publications mentioned in the prior art section disclose a technique in an attempt to achieve this object. However, they have suffered from the problems as described above.

Preferably, the core 60 is made of a magnetic material having a small temperature coefficient in magnetic permeability and in resistivity in order to minimize $\Delta(dZac/dT)$. The temperature coefficient of magnetic permeability is not so large among a variety of kinds of magnetic materials in a temperature range, for example, from about −40 to +130° C. Therefore, it is preferable to use a magnetic material having a small temperature coefficient in resistivity. Some of the examples of such a magnetic material are nichrome (alloy of nickel, chrome, and iron) and iron chrome (alloy of iron, chrome, and aluminum). These metallic materials are frequently used as a raw material for heating wire, and accordingly are obtainable at a very low cost. In view of this, the core 60 having excellent temperature characteristics can be produced at a low cost by forming the core 60 made of the metallic material according to a bending process. This will be described in detail in a second embodiment.

Figure 15:
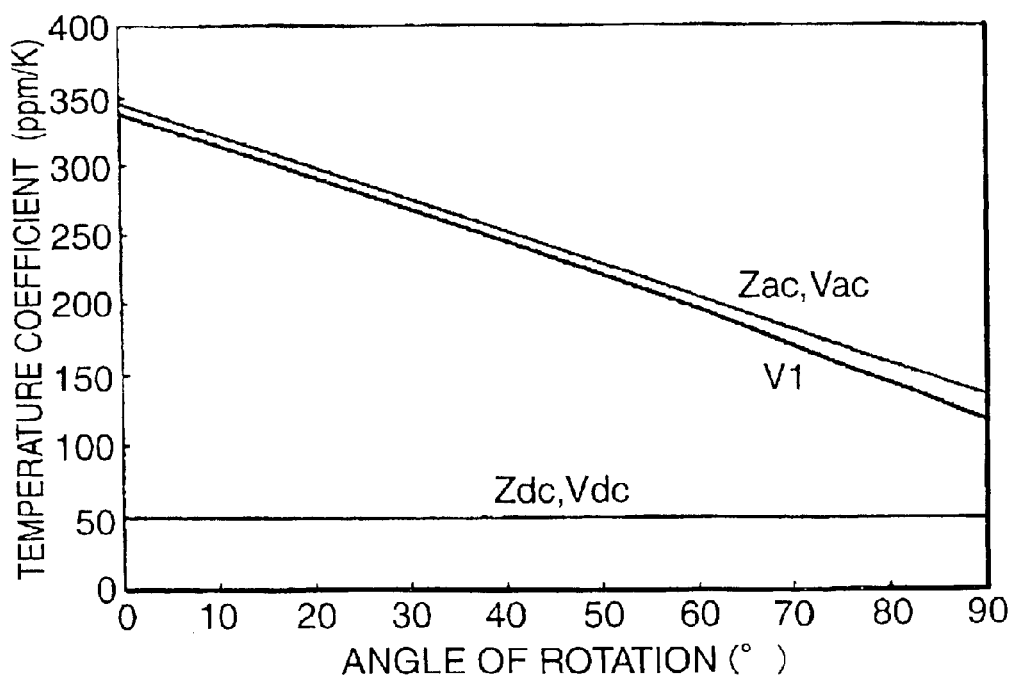
FIG. 15 is a reference graph showing a relation between angle of rotation and temperature coefficient of output voltage detected at the opposite ends of the detection coil.

Next, although it is not a primary feature in this embodiment, the following fact should be noted. That is, there may occur a phenomenon that $\Delta(dV1/dT)$ becomes larger than $\Delta(dZac/dT)$ if setting of the direct current Idc, alternate current Iac, DC resistance Zdc, AC resistance Zac, and respective temperature coefficients thereof is not proper. For example, let's assume that there is a detection coil 20 in which DC resistance Zdc=100 Ω (temperature coefficient: 50 ppm/K, and AC impedance Zac is expressed by the equation (3) where Z0=800 Ω, Z'=−8 Ω/deg, β0=346 ppm/K, β'=−2.35 ppm/K/deg. FIG. 15 shows the result of plotting the respective temperature coefficients of the factors corresponding to those in FIG. 8 in the case where direct current Idc=0.2 mA, and alternate current Iac=1.0 mA are supplied to the detection coil 20 (in both cases of direct current and alternate current, the temperature coefficient is 0). It is clear from FIG. 15 that $\Delta(dV1/dT)$ is larger than $\Delta(dZac/dT)$. Therefore, it should be concluded that $\Delta(dV1/dT)$ does not always decrease by simply supplying a direct current Idc to the detection coil 20.

Figure 34:
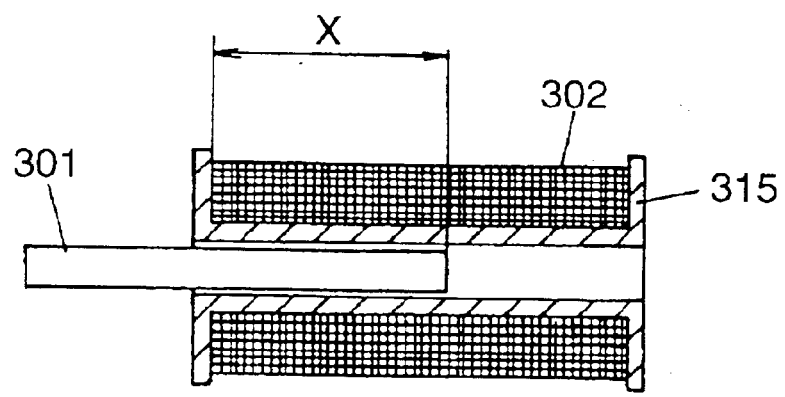
FIG. 34 is a side view in section showing a first position sensor according to prior art.
Figure 35:
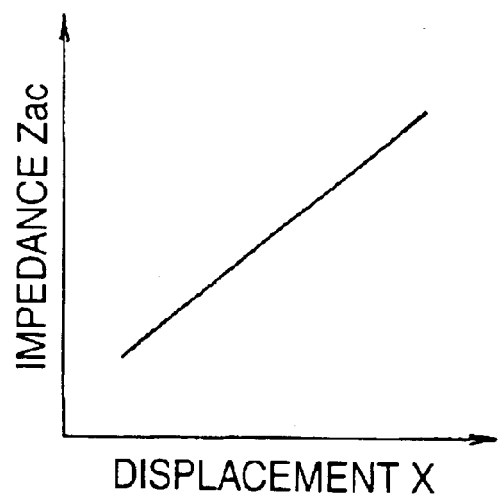
FIG. 35 is a graph showing a relation between displacement of a core in the first conventional position sensor and alternate current impedance of a detection coil.
Figure 36:
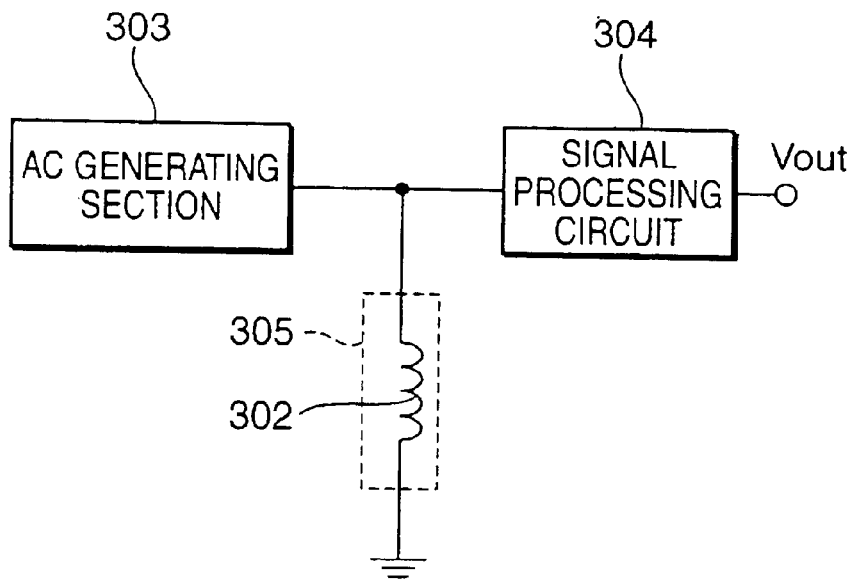
FIG. 36 is a diagram showing a circuit configuration of the first conventional position sensor.
Figure 37:
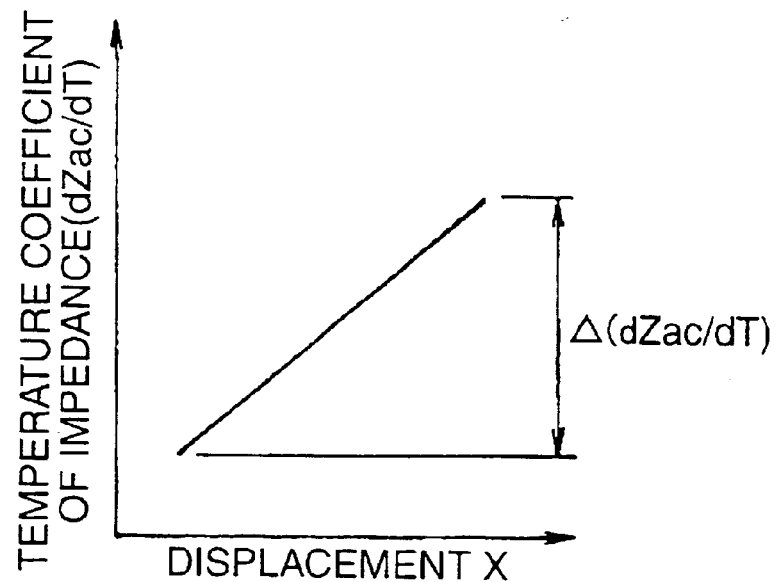
FIG. 37 is a graph showing a relation between displacement of a core in the first conventional position sensor and temperature coefficient of alternate current impedance of the detection coil.
Figure 38:
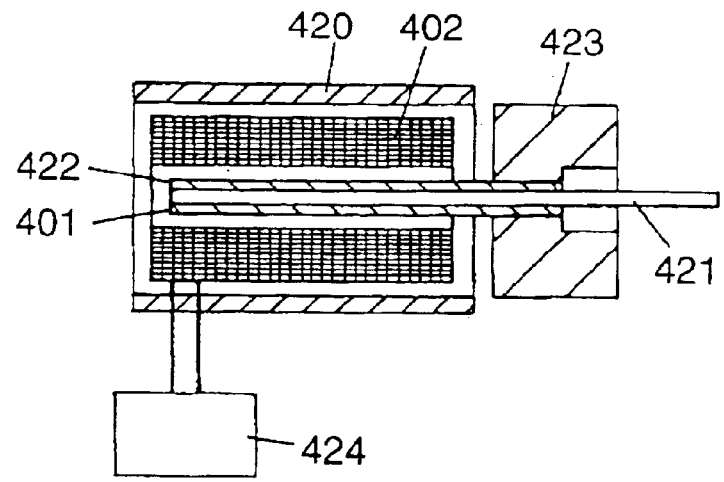
FIG. 38 is a side view in section showing a second position sensor according to prior art.
Figure 39:
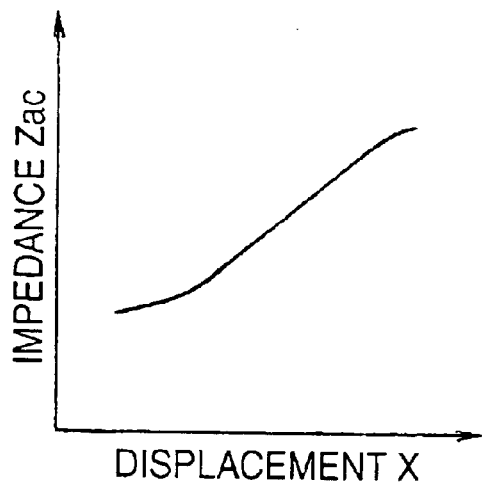
FIG. 39 is a graph showing a relation between displacement of a core in the first conventional position sensor and alternate current impedance of the detection coil in a state closer to an actual state.

This invention has been described with respect to a rotary position sensor in the first embodiment. Alternatively, a similar effect as in the first embodiment is obtained by using a position sensor whose displacing direction is linear as shown in the prior art of FIG. 34.

Second Embodiment

In this embodiment, described is a temperature compensation method for keeping the temperature characteristic of impedance Z of the detection coil 20 from being affected by relative displacement of the core 60 to the coil 20 by setting a state where the value of $\Delta(dZac/dT)$ is minimized as an ideal state. The arrangement of the position sensor in this embodiment is substantially the same as that in the first embodiment. Accordingly, elements in the second embodiment which are identical to those in the first embodiment will be denoted at the same reference numerals, and description on the identical parts will be avoided.

As a first temperature compensation method, described is a method for matching the temperature change ratio of impedance Z of the detection coil 20 in the case where the core 60 is not passed through the detection coil 20 with the temperature change ratio thereof in the case where the core 60 is passed through the detection coil 20.

Figure 16:
FIG. 16 is a diagram showing an equivalent circuit of a detection coil in a second embodiment of this invention.
Figure 17:
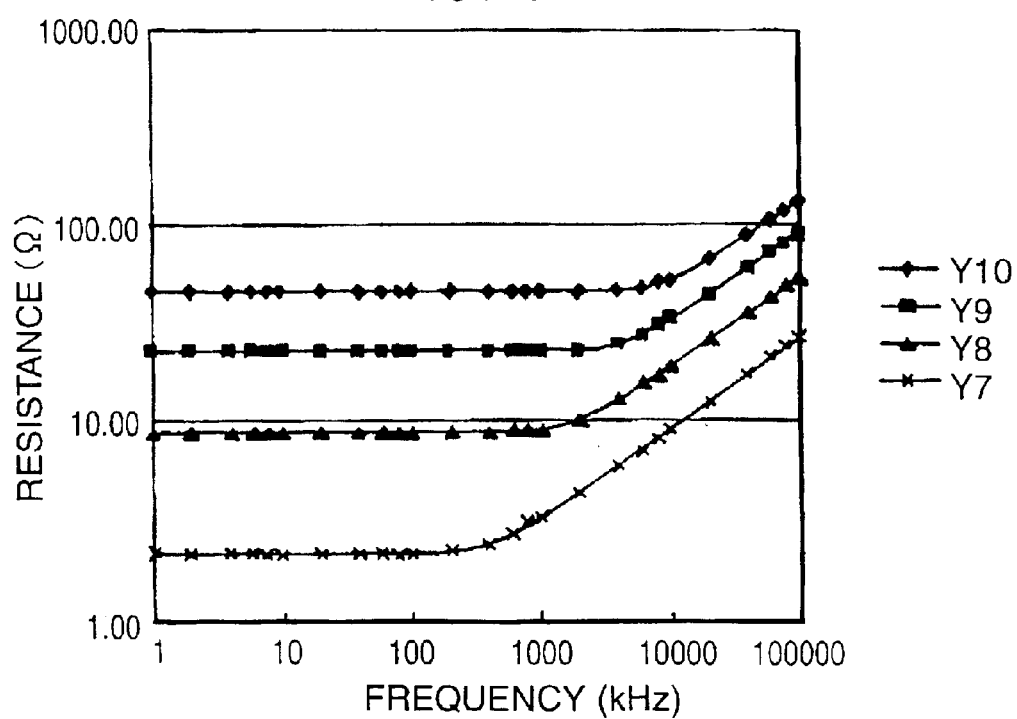
FIG. 17 is a graph showing a variation of resistance value of a copper wire due to a skin effect in the second embodiment of this invention.

Impedance Z of the detection coil 20 is equivalent to a series circuit where a resistance component Rs and an inductance component Ls are connected in series, as shown in FIG. 16. The inductance component Ls includes a component resulting from an outer surface of the coil (skin effect). In the case where the thickness of the skin depth of the coil is sufficiently small and the frequency is constant, the skin effect is proportional to power ½ of volume resistivity ρ. Accordingly, the temperature coefficient of the inductance component Ls is subjected to power ½ of volume resistivity ρ. FIG. 17 is a graph showing a variation of resistance of a copper wire due to the skin effect, namely, showing a relation between frequency and resistance of a copper wire. Curves Y7, Y8, Y9, Y10 show the relation in the case where the copper wire has a diameter of 0.32 mm, 0.16 mm, 0.10 mm, and 0.07 mm, respectively. The manner of variation of resistance differs depending on the diameter of the wire of the coil and the frequency.

Figures 18, 19:
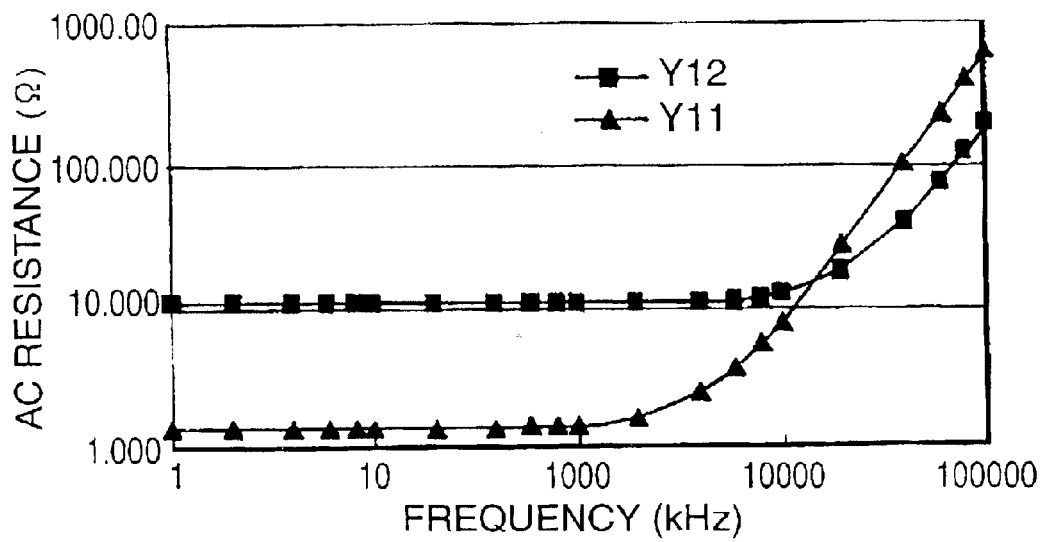
FIG. 18 is a graph showing a variation of resistance value of a copper wire due to a proximity effect in the second embodiment of this invention.
FIG. 19 is a list showing characteristics of magnetic materials used in a core in a third embodiment of this invention.

The temperature coefficient of the resistance component Rs greatly depends on the temperature coefficient of volume resistivity ρ of a wire material. The resistance component Rs is also subjected to proximity effect of the coil. FIG. 18 is a graph showing a variation of resistance of a copper wire due to proximity effect of the coil, namely, a relation between frequency and resistance of a copper wire. Curves Y11 and Y12 show the relation in the case where the copper wire is 0.16 mm and the number of winding is 40 times, and the copper wire is 0.07 mm and the number of winding is 60 times, respectively. The proximity effect is a phenomenon that uniform flow of electric current through the wound wire is obstructed in the case that the pitch of the coil winding is small. The smaller the pitch is, the greater the proximity effect is. However, the proximity effect varies depending on the diameter of the wire as well as the pitch. Since the resistance component due to proximity effect has dependency on power −1 of volume resistivity ρ, the temperature coefficient thereof is subjected to power −1 of volume resistivity ρ.

Specifically, in the case where the wire diameter is sufficiently large or the frequency is sufficiently high, the temperature coefficient of impedance Z of the detection coil 20 in the case where the core 60 is not passed through the coil 20 decreases due to the skin effect and the proximity effect. In view of this, by appropriately setting the volume resistivity ρ of the wire material, the wire diameter, the number of winding, the pitch of winding, and the frequency, DC resistance component, component due to skin effect, and component due to proximity effect in a displacement state where the core 60 is not passed through the detection coil 20 are controlled in a well-balanced manner, thereby minimizing the temperature coefficient of impedance Z of the detection coil 20. The above arrangement provides solution for the problem that the temperature coefficient of impedance of the detection coil 20 varies depending on a displacement of the core 60, which the prior art has suffered from.

Since copper has a very large temperature coefficient in volume resistivity ρ, it is desirable to select a material having a temperature coefficient in volume resistivity ρ smaller than that of copper, as a wire material. Specifically, nichrome, manganin, or copper-nickel alloy may be used to form a wire of the detection coil 20. Particularly, copper-nickel alloy is preferable because changing the composition ratio of the alloy makes it possible to control the volume resistivity ρ.

Next, described is a second temperature compensation method for matching the temperature change ratio of impedance Z of the detection coil 20 in the case where the core 60 is passed through the detection coil 20 with the temperature change ratio thereof in the case where the core 60 is not passed through the detection coil 20.

Increase of impedance Z of the detection coil 20 by passing of the core 60 through the detection coil 20 results from volume resistivity ρ and magnetic permeability μ of the core 60. Namely, the temperature coefficient of impedance Z of the detection coil 20 has a relation to volume resistivity ρ and magnetic permeability μ of the core 60. In view of this, it is preferable to select the core 60 having volume resistivity ρ and magnetic permeability μ which is suitable to match the temperature coefficient in the case where the core 60 is passed through the detection coil 20 with the temperature coefficient in the case where the core 60 is not passed through the detection coil 20, or to perform a surface treatment onto the core 60 that enables to attain appropriate volume resistivity ρ and magnetic permeability μ.

Generally, the ambient temperature under which a position sensor is used is in the range of 120 to 130° C. Curie temperature of the core 60 is sufficiently higher than the ambient temperature. Magnetic permeability μ of the core 60 has a characteristic that it sharply decreases in vicinity of Curie temperature. On the other hand, magnetic permeability μ of the core 60 seldom changes in a temperature zone where the position sensor is used.

In view of the above, by using the core 60 having an outer surface at least made of a material having a small variation in volume resistivity ρ, which is another factor resulting from increase of impedance Z of the detection coil 20, the temperature coefficient of impedance Z of the detection coil 20 is minimized, thereby minimizing variation of impedance Z of the detection coil 20 due to temperature change.

For instance, in a position sensor for detecting the position of the core based on a change of impedance of the detection coil 20 in the first embodiment, a primary component of the impedance is inductance. A magnetic field is generated coaxially with the detection coil 20 by flowing of a constant current through the detection coil 20. Then, a ring current (so-called eddy current) flows through the core 60 in such a direction as to cancel the coaxially generated magnetic field. The ring current has an action of lowering inductance of the detection coil 20. The magnitude of the ring current has a relation to volume resistivity of the core 60, in addition to magnitude and frequency of the magnetic field to be applied to the detection coil 20 (the magnitude of the ring current does not change if a constant current is applied at a fixed frequency). Specifically, the greater the volume resistivity of the core 60 is, the smaller the ring current is, thereby minimizing an action of lowering inductance. Accordingly, if the volume resistivity of the core 60 has a temperature characteristic, inductance also has a temperature characteristic. The temperature characteristic of inductance greatly affects the temperature characteristic of impedance.

In the case where the detection coil 20 is actually used as an impedance element, it is often the case that a current to be supplied to the detection coil 20 is driven at a frequency ranging from about several ten kHz to several hundred kHz. If a current is applied in such a frequency range, magnetic field generated by the detection coil 20 does not reach inside the core 1 (sic) with the result that the magnetic field gathers around the core 60.

In view of the above, it is preferable to form at least a surface of the core 60 of a material having a small volume resistivity ρ, namely, a material selected from the group consisting of nickel-chrome alloy, nickel-chrome-iron alloy, iron-chrome-aluminum alloy, copper-nickel alloy, and manganin. These materials are called as electric heating material. These materials have a small temperature coefficient in resistance. Further, since iron and nickel are a magnetic material, alloy made of such a material may have magnetism. Therefore, by using these materials, a large impedance change of the detection coil 20 is absorbed.

If the core 60 has a bulky shape and a small volume resistivity over the bulky shape as well as its surface, such a core 60 has a more excellent temperature characteristic. In such a case, electric heating materials such as nickel-chrome alloy, nickel-chrome-iron alloy, iron-chrome-aluminum alloy, copper-nickel alloy, and manganin may be used. If the core 60 is obtained by punching a flat plate made of these materials, a large quantity of unused material is generated, which makes the resultant core expensive.

In order to solve the above drawback, the following measure is taken. Since these materials are widely available on the market as electric heating wire material, it is economical to use the electric heating wire made of nickel-chrome alloy, nickel-chrome-iron alloy, iron-chrome-aluminum alloy, copper-nickel alloy, manganin or its equivalent by cutting the wire into a wire segment having a required length and by bending (or drawing) the wire segment into an appropriate shape. This is effective in preventing generation of industrial waste.

Also, temperature compensation is effectively carried out by combining the first and second temperature compensation methods in this embodiment.

Third Embodiment

In this embodiment, a method of improving linearity of output is described. The construction of the position sensor in accordance with the third embodiment is substantially the same as that in the first and second embodiments. Accordingly, elements in the third embodiment which are identical to those in the first and second embodiments will be denoted at the same reference numerals, and description on the identical parts will be avoided.

A first linearity improving method is to select an appropriate material for the core 60 and to set the frequency f of the alternate current Iac appropriately. The inventors of this invention carried out experiments concerning linearity of AC impedance Zac by changing the material of the core in relation to the detection coil 20 which has been exemplified in the first embodiment. FIG. 19 shows a list of the used metallic materials: soft magnetic iron, permalloy, electromagnetic stainless, SUS430, and iron chrome, and corresponding estimated characteristics: resistivity. In FIG. 19, "electromagnetic stainless" is a metal in which 11% of chrome is contained with various metals such as silicon, manganese, phosphorous, nickel, and titanium being added thereto. The metal is used for electromagnetic valves and yokes of relay circuits. The respective metallic materials have been thermally treated under the conditions specific thereto in order to allow each metal to exhibit its magnetic characteristic. The shapes of the respective cores made of these metallic materials are identical to one another.

FIGS. 20A through 20E show results of the experiments concerning linearity of AC impedance Zac of the respective cores in the case where frequency f of alternate current Iac is set at 10 kHz, 30 kHz, 50 kHz, 70 kHz, and 90 kHz, respectively. As is obvious from FIGS. 20A through 20E, magnetic stainless (electromagnetic stainless) exhibits desirable linearity compared with soft magnetic iron and pure iron. Particularly, SUS430 (ferrite stainless using 18-Cr) has desirable linearity with respect to frequency as well as spun of angle of rotation, has resistance against corrosion, and is inexpensive. Accordingly, SUS430 is considered to be an appropriate material for the core of the position sensor. It is conceived that these linearities are determined by balance between resistivity and magnetic permeability, and frequency characteristic. Since iron chrome has desirable linearity when the frequency f is not smaller than 50 kHz, iron chrome may be an appropriate material for the core by performing a measure regarding resistance against corrosion, taking into consideration of the aforementioned advantage on temperature change ratio in resistivity.

Figure 21A:
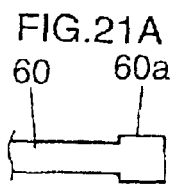
FIGS. 21A through 21D are diagrams each showing an end part of the core in the third embodiment of this invention.

A second linearity improving method is to conduct measures to suppress the aforementioned "end effect" which the prior art has suffered from. FIGS. 21A and 21B show a method for enhancing contribution of a lead end part 60a or 60b of the core 60 with respect to AC impedance Zac by altering the configuration of the core 60. In FIG. 21A, the lead end part 60a has a thickness larger than the remaining part of the core 60 by providing a stepped portion having a substantially right angle. In FIG. 21B, the lead end part 60b has a wedge shape with a thickness larger than the remaining part of the core 60. In both cases of FIGS. 21A and 21B, the lead end part (60a or 60b) has a thickness larger than the remaining part of the core, which makes it possible to increase the quantity of interlinkage flux among the pitches of the wound wire. Thus, this arrangement effectively contributes to increase of inductance. As far as the core 60 is formed by etching or metal injection molding, this arrangement does not lead to cost rise in producing the position sensor.

Figure 21C:
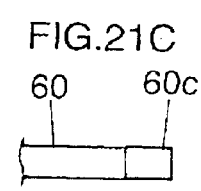
Figure 21B:
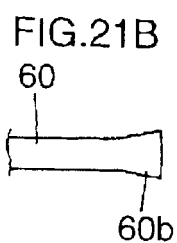

FIG. 21C shows an example where a lead end part 60c of the core 60 is made of a material having a higher magnetic permeability than that of the core main body. In this example, since the quantity of interlinkage flux at the lead end part 60c can be increased, this arrangement contributes to increase of inductance effectively. Compared with the cases in FIGS. 21A and 21B where the part of the core 60 other than the lead end part has a smaller thickness than the lead end part, which may lead to sensitivity deterioration of the sensor to some extent, the example shown in FIG. 21C is free from sensitivity deterioration. Further, since the core 60 shown in FIG. 21C has a uniform thickness, the core 60 is stable in the aspect of mechanical engineering (namely, is not easily deformed upon application of a small external force).

Figure 21D:
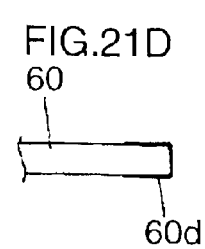

FIG. 21D shows an example where a lead end part 60d is surface-treated (plating or its equivalent) with a material having a high magnetic permeability. The example of FIG. 21D provides improvement to the example of FIG. 21C in the aspect of reducing the time and labor for production and in facilitating positioning. In the example of FIG. 21D, it may be possible to attach a film member having a high magnetic permeability onto the lead end part 60d, in place of plating.

Figure 22:
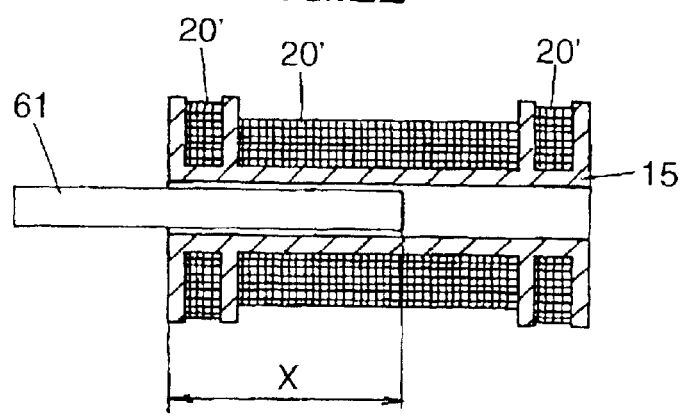
FIG. 22 is a side view in section showing a position sensor having a linear stroke arrangement in the third embodiment of this invention.
Figure 23A:
FIGS. 23A through 23E are diagrams each showing an end part of the core with its edge being removed in the third embodiment of this invention.
Figure 23B:
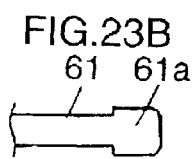
Figure 23C:
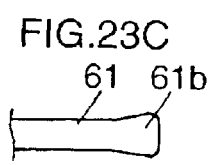
Figure 23D:
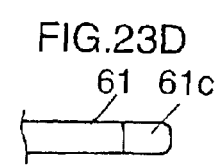
Figure 23E:
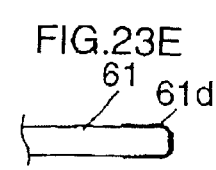

A position sensor shown in FIG. 22 is comprised of a detection coil 20' which is produced by winding a wire on a hollow bobbin 15, and a core 61 which is movable in and out through the hollow portion of the bobbin 15 by being displaced relative to the detection coil 20' in a winding direction X of the wire. The position sensor is provided with a constant current circuit (not shown) and a signal processing circuit (not shown) in the similar manner as in the first embodiment. In the third embodiment, a wire is wound around the opposite end portions of the detection coil 20' with a larger thickness than the remaining part of the detection coil 20' (namely, the number of layers of the wound wire is greater than that of the remaining part), with the shape of the core 61 remaining the same as that in the conventional art. With this arrangement, magnetic flux generated by the large number of layers of the wound wire is interlinked, which makes it possible to increase inductance effectively even if the core 61 is passed only through the lead end part of the detection coil 20'.

FIGS. 23A through 23E show examples where a lead end part of the core 61 has its edge removed by chamfering, round-off treatment or the like in order to keep the core 61 from being abutted against the inner wall of the bobbin of the detection coil 20'. FIGS. 23B through 23E show examples corresponding to FIGS. 21A through 21E (sic) in which chamfering or round-off treatment is conducted with respect to the lead end part of the respective cores in FIGS. 21A through 21D.

In FIG. 4 showing a cross section of the core 60 and the detection coil 20, the inner surface of the curved bobbin 22 through which the core 60 is passed is applied with the coating 21 which is obtained by vapor deposition of non-magnetic metal such as copper so as to keep the core 60 from being abutted against the inner wall of the bobbin 22. In the case where a material having conductivity such as a metal is used as a material for the coating 21, it is necessary to keep the material from forming a closed loop within its cross section. Alternatively, part of a side surface of a through-hole of the bobbin 22 may be made of a sheet metal, in place of applying metal vapor deposition. Applying fluorine coating, which provides slidability and resistance against abrasion, provides the same effect as the above. In this arrangement, a film member or a linear member (particularly, amorphous) is used as the core 60, and such a core is movable or displaceable along the side surface of the through-hole of the curved bobbin 22. This arrangement is effective in producing a thin and small-diametrical position sensor and in improving linearity of output.

In addition to the above, constituting the winding wire of the detection coil 20 with use of a spring coil and passing the spring coil through the curved bobbin 22 facilitates winding of the wire at a uniform pitch in the direction of angle of rotation of the core.

Next, referring to FIG. 2, the position sensor is provided with the curvature corrector 24 for restoring the shape of the curved bobbin into its original state. The curved bobbin is deformed, i.e. the curvature of the curved bobbin is increased by application of a tension stress of the wire onto the curved bobbin. The curvature corrector 24 is formed with a groove having substantially the same curvature as the detection coil 20. As the detection coil 20 is fitted along the groove of the curvature corrector 24, a radially inner wall and a bottom surface of the detection coil 20 are brought into contact with the curvature corrector 24. Thus, increase of the curvature of the curved bobbin 22 is corrected. In FIG. 2, the housing 25 is equipped with the curvature corrector 24. Alternatively, a groove similar to the groove in the curvature corrector 24 may be formed in the housing 25 itself.

Figure 24:
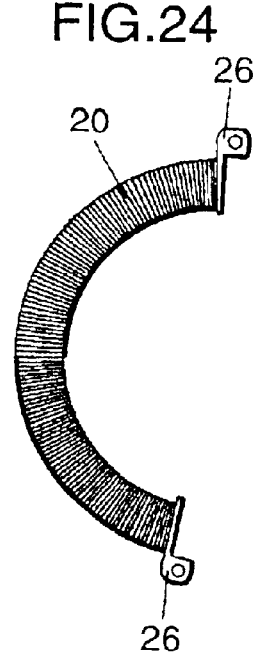
FIG. 24 is a diagram showing a detection coil provided with a pair of retaining/fixing members at opposite ends thereof in the third embodiment of this invention.

Employing the detection coil equipped with the curvature corrector 24 is also advantageous in the following point. If a detection coil is not equipped with a curvature corrector, as shown in FIG. 24, it is required to provide a pair of retaining/fixing members 26 at an outside of the opposite ends of the detection coil 20 in vicinity of a flange thereof for position retaining and fixing of the detection coil 20. Providing the retaining/fixing members 26 restricts a stroke (mechanical displacement) of the core 60. On the other hand, the arrangement of FIG. 2 where the retaining/fixing member is not provided outside of the flange of the detection coil 20 is advantageous because a stroke of the core 60 can be made longer, or the angle of rotation corresponding to the winding part on the curved bobbin 22 can be made wider in place of a long stroke. Both of the arrangements provides improvement in linearity.

Fourth Embodiment

Figure 25:
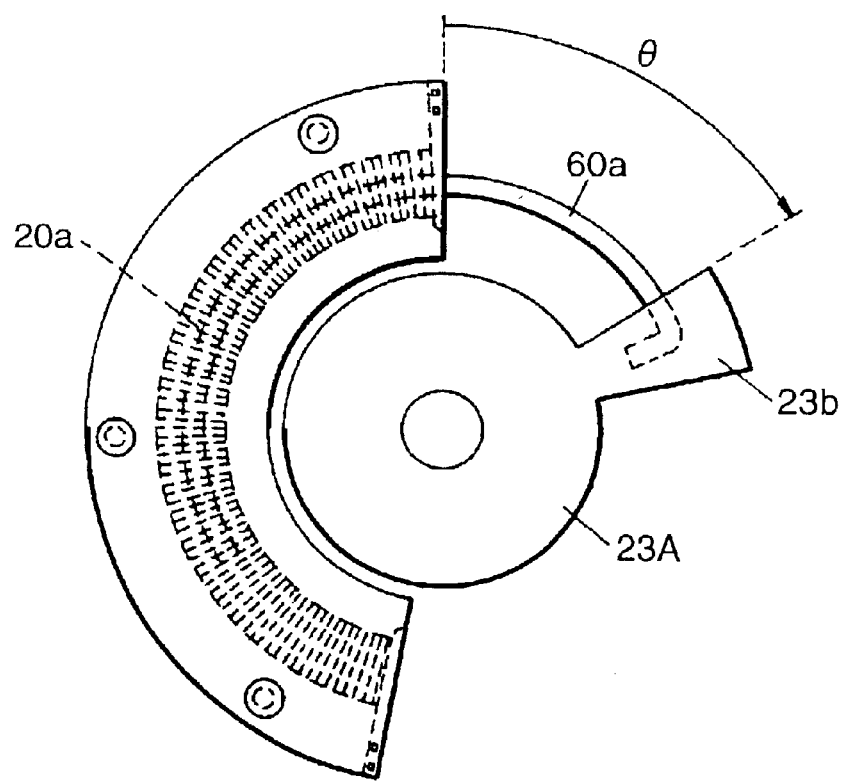
FIG. 25 is a top plan view showing an upper surface of a first position sensor provided with two detecting sections in accordance with a fourth embodiment of this invention.
Figure 26:
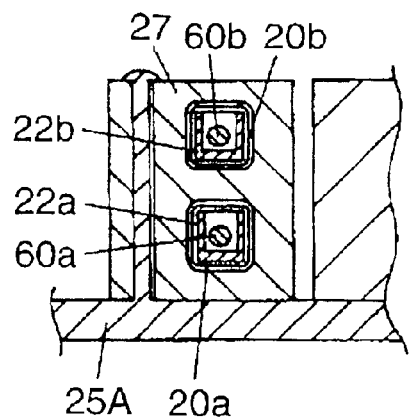
FIG. 26 is a side view in section showing a part of the first position sensor in the fourth embodiment of this invention.

A position sensor in accordance with a fourth embodiment is described referring to FIGS. 25 through 28. The position sensor in this embodiment is made based on an idea of a failsafe system, in consideration of its use in an automotive vehicle (e.g. position detection of acceleration pedal). In view of this, the position sensor in this embodiment has a construction that the detecting section of the position sensor shown in FIGS. 2 and 3 has a double layer. Specifically, in FIGS. 25 and 26, provided are two detection coils 20a, 20b having a curvature identical to each other, and two cores 60a, 60b which have a curvature identical to each other and are passed through the respective detection coils 20a, 20b about an axis of rotation of a movable block 23A. The detection coils 20a, 20b are laid one over the other coaxially along the axis of rotation of the cores 60a, 60b. Compared with the arrangement disclosed in Japanese Unexamined Patent Publication No. 2000-186903 where two detection coils are arranged on the same plane, the above arrangement makes it possible to increase an opening angle of the winding part of the detection coils 20a, 20b, and a mechanical angle of rotation of the movable block 23A. Therefore, this arrangement secures a wide range of angle of rotation θ where desirable linearity of respective impedances Z of the detection coils 20a, 20b is obtained. Further, since the specifications of the detection coil 20a is identical to those of the detection coil 20b, the characteristics of the detection coils 20a, 20b can be made substantially identical to each other, which is advantageous in wire winding and in suppressing cost rise.

Figure 27:
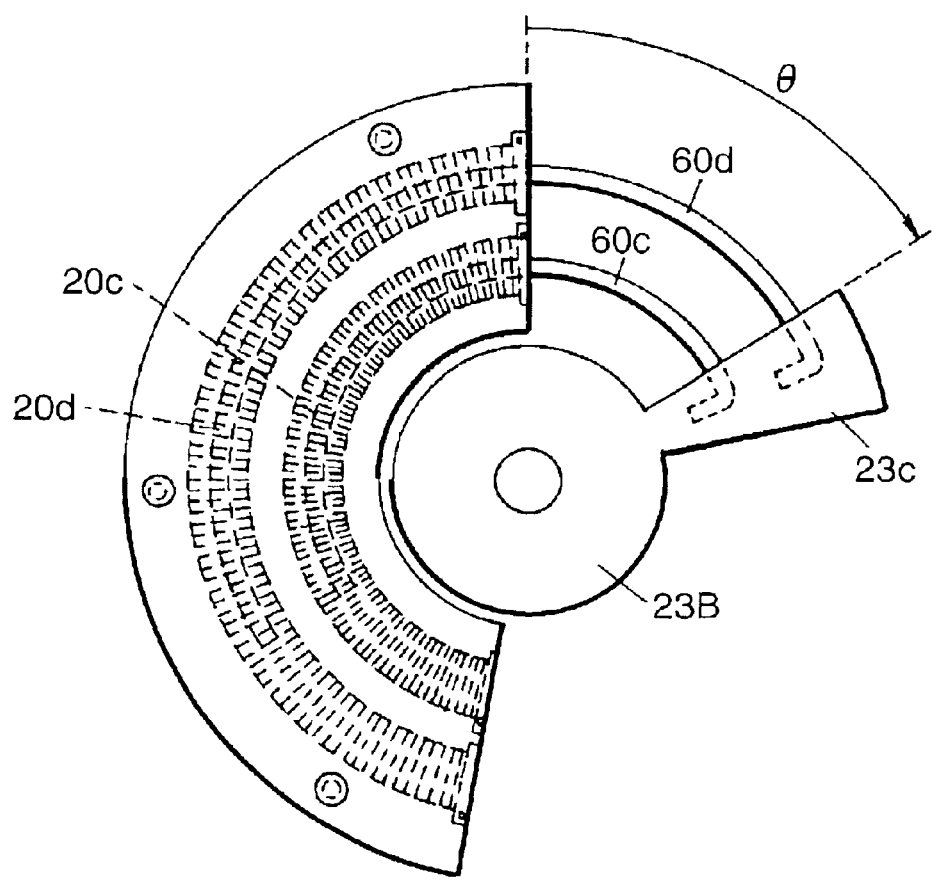
FIG. 27 is a top plan view showing an upper surface of a second position sensor provided with two detecting sections in accordance with the fourth embodiment of this invention.

A position sensor shown in FIGS. 27 and 28 is comprised of a detection coil 20c having a large curvature (small radius of curvature), a detection coil 20d having a small curvature (large radius of curvature), a core 60c which has a large curvature and is passed through the detection coil 20c as being rotated about the axis of rotation of a movable block 23B, and a core 60d which has a small curvature and is passed through the detection coil 20d as being rotated about the axis of rotation of the movable block 23B. The detection coils 20c, 20d are arranged substantially within the same range of angle of rotation θ with respect to the axis of rotation of the cores 60c, 60d and on the same plane. With this arrangement, similar to the position sensor shown in FIGS. 25 and 26, the opening angle of the winding part on the detection coils 20c, 20d, and the mechanical angle of rotation of the movable block 23B are increased. Thereby, secured is a wide range of angle of rotation θ where desirable linearity of respective impedances Z of the detection coils 20c, 20d is obtained, and a thin position sensor is producible.

Prior to assembling into the detection coils 20a, 20b (20c, 20d) as shown in this embodiment, the detection coils 20a, 20b (20c, 20d) may be integrally molded with the curved bobbins 22a, 22b (22c, 22d) by using a resin 27 (28) after winding a wire on the curved bobbins 22a, 22b (22c, 22d). This arrangement prevents disconnection of wire which may occur at the time of assembling and/or at the time of application of vibration and/or impact, and keeps the coils 20a, 20b (20c, 20d) from being displaced relative to each other. This arrangement blocks variation of output between the two detecting sections due to positional displacement at the time of assembling. In this arrangement, since the two detecting sections are made into a one-piece unit by integral molding, the two detecting sections are easily positioned relative to the movable block 23A (23B), which shortens the time required for assembling.

Since resin molding is conducted in a state that deformation of the curved bobbins 22a, 22b (22c, 22d) is corrected, there is no need of providing dedicated parts required for correcting deformation of the curved bobbins 22a, 22b (22c, 22d) in a housing 25A (25B). Furthermore, if the two cores 60a, 60b (60c, 60d) are integrally resin-molded, these parts are free from positional displacement, which eliminates generation of variation of characteristics between the two detecting sections due to positional displacement at the time of assembling.

Fifth Embodiment

The arrangement of a position sensor in accordance with a fifth embodiment is the same as that of any one of the first through fourth embodiments. Accordingly, identical parts in the fifth embodiment to those in the first through fourth embodiments will be denoted at the same reference numerals, and description on the identical parts will be avoided. In this embodiment, the arrangement of a displacement signal Vout which is outputted from a signal processing circuit 40 is described.

In the case where an electronic control unit (ECU) which is a system of processing a signal outputted from a position sensor is a digital circuit, redundant A/D conversion and D/A conversion are repeated if a displacement signal Vout is an analog signal, with the result that a detection error may occur and a response delay may be accompanied. If a displacement signal Vout is a digital signal, the aforementioned problem typical to an analog signal is eliminated. Further, a digital signal is not liable to be affected by an external noise in signal transmission. In view of this, in this embodiment, described are some of the examples where a displacement signal Vout outputted from the signal processing circuit is a digital signal. The signal processing circuit 40 comprises a signal correcting circuit (not shown) including an A/D converting circuit (not shown) for converting a peak voltage V1 of an output voltage from a detecting section 50 into a digital signal, and a correcting circuit for performing digital trimming with respect to the digital signal.

FIGS. 29A and 29B show a first example of a displacement signal Vout outputted from the signal processing circuit 40. The displacement signal Vout comprises an output initiate signal having a width T1 corresponding to three pulse widths of a reference pulse Vr, and a pulse signal which is outputted upon lapse of a duration T2 after the output of the output initiate signal. The duration T2 differs depending on position data. The ECU judges relative position of the core 60 to the detection coil 20 by measuring the pulse width T1 of the output initiate signal, and the duration T2 until the pulse signal appears, with a timer.

FIGS. 30A and 30B show a second example of the displacement signal Vout outputted from the signal processing circuit 40. The displacement signal Vout consists of an output initiate signal having a width corresponding to three pulse widths of a reference pulse Vr, and a certain number of pulse signals which follows the output initiate signal. The number of pulse signals differs depending on position data. The ECU judges relative position of the core 60 to the detection coil 20 by counting the number of pulse signals which follows the output initiate signal, with a counter.

FIGS. 31A and 31B show a third example of the displacement signal Vout outputted from the signal processing circuit 40. The displacement signal Vout consists of a pulse signal having a duty ratio in correspondence to position data. The on-, off- periods of the duty ratio are each determined by the number of reference pulses Vr. The ECU judges relative position of the core 60 to the detection coil 20 by measuring the cycle and width of the pulse signal, with a timer.

If a required bit number of digital output is attempted to be secured, the number of wirings connecting the position sensor and the ECU may increase. However, according to the examples shown in FIGS. 29A through 31B, the circuit configuration is established with only a single signal line. Further, the displacement signal Vout may consist of a pulse signal having a pulse width in correspondence to position data. Further alternatively, if there is no constraint concerning the number of signal lines, the displacement signal Vout may consist of a certain bit number of digital signal which satisfies resolution required for position detection.

Sixth Embodiment

Figure 33:
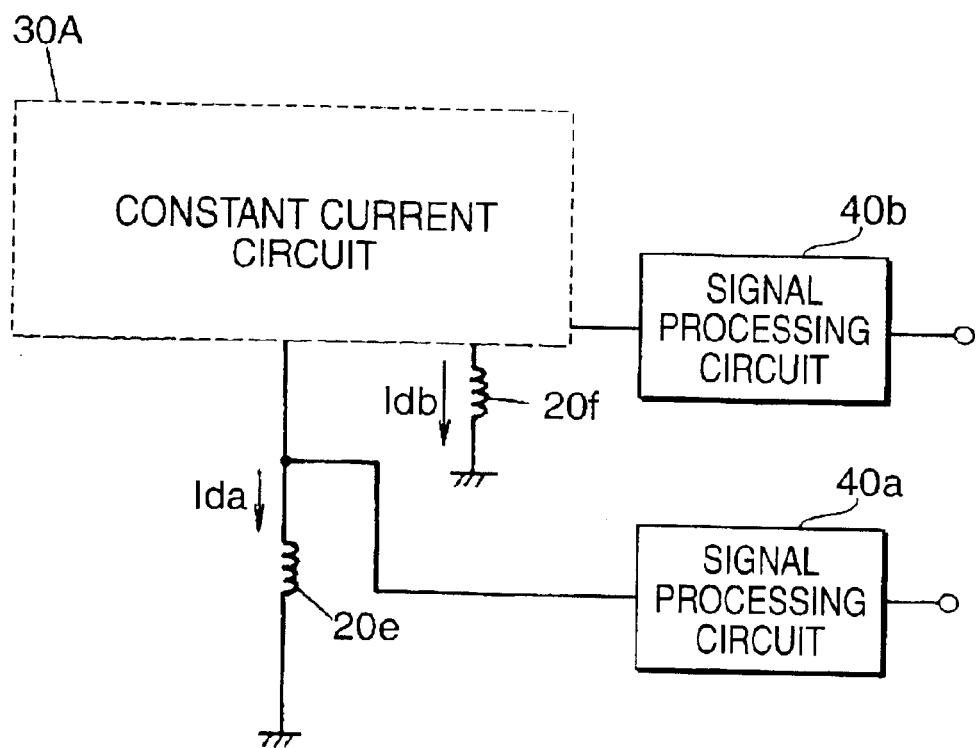
FIG. 33 is a diagram showing a circuit configuration of the position sensor in the sixth embodiment of this invention.

A cross sectional construction and a circuit configuration of a detection coil of a position sensor in accordance with a sixth embodiment of this invention are respectively shown in FIGS. 32 and 33. The position sensor in the sixth embodiment has a double-layered detecting section based on a failsafe system, considering its use in an automobile.

The position sensor in this embodiment comprises detection coils 20e, 20f, a core 60e, a constant current circuit 30A, a signal processing circuit 40a, and a signal processing circuit 40b. The detection coils 20e, 20f are respectively wound around hollow bobbins 15a, 15b and are opposed to each other in a winding direction. The core 60e is movable relative to the detection coils 20e, 20f in the winding direction and is passed through the hollow portions of the bobbins 15a, 15b. The constant current circuit 30A outputs constant currents Ida, Idb respectively to the detection coils 20e, 20f. The constant current Ida (Idb) is obtained by superposing an alternate current of a given frequency and a given amplitude to a direct current of a given amplitude. The signal processing circuit 40a converts a peak voltage of a voltage detected at the opposite ends of the detection coil 20e to a displacement signal indicative of position data of the core 60e relative to the detection coil 20e. The voltage detected at the opposite ends of the detection coil 20e is determined based on the constant current Ida outputted from the constant current circuit 30A and impedance Za of the detection coil 20e. The signal processing circuit 40b converts a peak voltage of a voltage detected at the opposite ends of the detection coil 20f to a displacement signal indicative of position data of the core 60e relative to the detection coil 20f. The voltage detected at the opposite ends of the detection coil 20f is determined based on the constant current Idb outputted from the constant current circuit 30A and impedance Zb of the detection coil 20f.

In this embodiment, the two detection coils 20e, 20f commonly use the core 60e which is attached to a structural member (not shown). The single constant current circuit 30A outputs the constant currents Ida, Idb each having a given frequency and a given amplitude to the detection coils 20e, 20f, respectively. With this arrangement, cost rise accompanied by providing the double-layered detecting section can be suppressed.

If the constant current circuit 30A and the signal processing circuits 40a, 40b which constitute an active circuit section is configured into a monolithic integrated circuit, cost rise accompanied by providing the double-layered detecting section can be further suppressed since the integrated circuit is a most expensive part.

Hereinafter, described are some of the examples as to how the position sensors in accordance with the first through sixth embodiments are used. First, in the case where the sensor is used for detecting the position of an acceleration pedal of an automobile, the following advantage is obtained. Since the angle of detection is relatively small such as about 30°, curved bobbins having a curvature identical to each other can be arranged on the same plane, and impedances of the detection coils can be made complementary to each other. Further, since the sensor is arranged inside the chamber of the automobile, the upper limit of the operative temperature of the sensor is not so high. In addition, since there is a sufficiently large stroke with respect to the angle of detection, an intermediate part of the stroke where desirable linearity is obtained can be used with less modification in the material and shape of the core.

Next, described is a case where the sensor is used as a throttle position sensor. In this case, the angle of detection is as large as about 90° or more. In addition, it is required to secure a large mechanical stroke. In view of this, suitable is the arrangement as shown in FIGS. 25 and 26 where the curved bobbins are laid one over the other, or the arrangement as shown in FIGS. 27 and 28 where the curved bobbins having curvatures different from each other are arranged in the same range of rotating angle on the same plane. Since there is a limit to the mechanical stroke with respect to the detection angle, it is desirable to use a material such as SUS430 for the core in order to obtain linearity on coil impedance easily. Since the throttle position sensor is arranged in an engine room, the sensor is required to satisfy a high upper limit of the operative temperature. In view of this, it is desirable to minimize a variation of the temperature characteristic (temperature coefficient) due to angle displacement by selecting a material for the core that enables to obtain linearity easily and by giving an appropriate bias current to the coil.

If the position sensor is used in a plant such as a power-generation facility, the position sensor is liable to be subjected to a high temperature. In view of this, it is desirable to minimize a variation of the temperature characteristic (temperature coefficient) of the detection coil due to angle displacement by using iron chrome as a material for the core and by giving an appropriate bias current to the coil.

It should be noted that there is a case that a single detecting section is provided in a position sensor for detecting the angle of a pedal in a motorized bicycle in the aspect of suppressing production cost. However, generally, it is preferable to provide a double-layered detecting section in a position sensor for detecting the angle of a pedal in an automobile in order to secure reliability as a system.

To summarize this invention, a position sensor according to an aspect of this invention comprises a constant current circuit for outputting a constant current which is obtained by superposing an alternate current having a given frequency and a given amplitude over a direct current having a given amplitude; a detecting section including at least a detection coil to which the constant current is supplied; a core made of a magnetic material, the core being displaced relative to the detection coil in an axial direction of the detection coil; and a signal processing circuit for outputting a displacement signal indicative of position data of the core relative to the detection coil based on a peak value of an output voltage from the detecting section upon supply of the constant current, wherein at least one of a ratio of the direct current to the alternate current of the constant current, a ratio of an AC component to a DC component of an impedance in the detecting section, a temperature characteristic of the ratio of the DC to the AC of the constant current, and a temperature characteristic of the ratio of the AC component to the DC component of the impedance in the detecting section is set in such a manner that a margin of fluctuation of a temperature coefficient of the peak value of the output voltage from the detecting section in a whole displacement zone of the core relative to the detection coil is smaller than a margin of fluctuation of a temperature coefficient of the AC component of the impedance in the detecting section at the given frequency in the whole displacement zone of the core relative to the detection coil.

In the above arrangement, the detection coil can be optimally selected depending on the object for position detection. Further, dependency of a temperature coefficient of the impedance of the detection coil can be easily suppressed by setting the constant on the circuit. As a result, a variation of the temperature coefficient of the impedance of the detection coil relative to the displacement can be compensated for with a simplified circuit configuration.

Preferably, the core may be operative to pass through a winding wire of the detection coil. This arrangement can absorb a large variation of the impedance of the detection coil.

Preferably, a temperature coefficient of a DC component of the output voltage from the detecting section may be closer to a temperature coefficient of an AC component of the output voltage from the detecting section in the case where a passing amount of the core through a winding wire of the detection coil is maximal than the temperature coefficient of the AC component of the output voltage from the detecting section in the case where the passing amount of the core is minimal. In this arrangement, the margin of fluctuation of the temperature coefficient of the peak value of the output voltage from the detecting section can be suppressed.

Preferably, the constant current circuit may include an oscillating circuit for generating a voltage which is obtained by superposing an AC voltage having a given frequency and a given amplitude over a DC voltage having a given amplitude, and a voltage-current converting circuit for converting the output voltage from the oscillating circuit into a current, and the ratio of the DC to the AC of the constant current may be set by setting the DC voltage and the AC voltage individually. In this arrangement, the ratio of the DC to the AC of the constant current can be set by providing a simplified circuit configuration and by setting a constant on the circuit.

Preferably, the constant current circuit may include an oscillating circuit for generating a voltage which is obtained by superposing an AC having a given frequency and a given amplitude over a DC voltage having a given amplitude, and a voltage-current converting circuit for converting the output voltage from the oscillating circuit into a current, and the temperature characteristic of the ratio of the direct current to the alternate current of the constant current may be set by setting a temperature coefficient of a value of a resistance provided in the oscillating circuit. The resistance determines a value of the DC voltage. This arrangement enables to obtain a similar effect as in the above.

Preferably, the constant current circuit may include an oscillating circuit for generating a voltage which is obtained by superposing an AC voltage having a given frequency and a given amplitude over a DC voltage having a given amplitude, and a voltage-current converting circuit for converting the output voltage from the oscillating circuit into a current, and the temperature characteristic of the ratio of the AC component to the DC component of the impedance in the detecting section may be set by setting a temperature coefficient of the frequency of the AC voltage.

In the above arrangement, even if the constant on the circuit cannot be easily set because the constant current circuit is comprised of an integrated circuit, the temperature characteristic of the AC component of the impedance of the detecting section can be set by adopting an arrangement that a resistance and a capacitor for determining the oscillating frequency of the AC voltage are mounted as an external element and by selecting the resistance values thereof and the temperature coefficient of the capacitor.

Preferably, the constant current circuit may include a direct constant current circuit for outputting a direct current having a given amplitude, and an AC circuit for outputting an AC having a given frequency and a given amplitude, and at least one of the ratio of the direct current to the alternate current of the constant current, the ratio of the AC component to the DC component of the impedance in the detecting section, the temperature characteristic of the ratio of the direct current to the alternate current of the constant current, and the temperature characteristic of the ratio of the AC component to the DC component of the impedance in the detecting section may be set by setting at least one of a temperature characteristic of the amplitude of the DC, a temperature characteristic of the frequency of the AC, and a temperature characteristic of the amplitude of the AC. In this arrangement, a variation of the temperature coefficient of the impedance of the detection coil relative to a displacement of the core can be compensated for by providing a simplified circuit configuration and by setting a constant on the circuit.

Preferably, the detecting section may include the detection coil, and a circuit element which is connected in series with the detection coil and has an impedance free from displacement of the core, the signal processing circuit may output the displacement signal indicative of the position data of the core relative to the detection coil based on a peak value of a voltage which is detected at both ends of the series circuit including the detection coil and the circuit element upon supply of the constant current to the detection coil, and at least one of the ratio of the AC component to the DC component of the impedance in the detecting section, and the temperature characteristic of the ratio of the AC component to the DC component of the impedance in the detecting section may be set by setting at least one of an AC component, and a DC component of the impedance of the circuit element, and respective temperature coefficients of the AC component and the DC component of the impedance of the circuit element.

In the above arrangement, even if the constant on the circuit cannot be easily set because the constant current circuit is comprised of an integrated circuit, a variation of the temperature coefficient of the impedance of the detecting section relative to a displacement of the core can be compensated for with a simplified circuit configuration.

Preferably, the circuit element may include a resistance. In this arrangement, the impedance of the detecting section can be controlled at a low cost.

Preferably, the circuit element may include an inductor. In this arrangement, the DC resistance and the AC impedance of the detecting section can be controlled at a low cost.

Preferably, the constant current circuit may include an integrated circuit having resistances for setting the amplitude of the DC, the frequency and the amplitude of the AC, and digital trimming means for setting the values of the resistances, and at least one of the ratio of the DC to the AC of the constant current, the ratio of the AC component to the DC component of the impedance in the detecting section, the temperature characteristic of the ratio of the DC to the AC of the constant current, and the temperature characteristic of the ratio of the AC component to the DC component of the impedance in the detecting section may be set by setting the value of the resistance by said digital trimming means. In this arrangement, a variation of the temperature coefficient of the impedance of the detection coil relative to a displacement of the core can be easily compensated for with a simplified circuit configuration.

Preferably, the signal processing circuit may include a rectifying circuit, and a peak-holding circuit for peak-holding an output from the rectifying circuit. In this arrangement, the signal processing circuit can be configured with a simplified circuit configuration.

Preferably, the signal processing circuit may include an amplifier having a temperature coefficient of a polarity opposite to a polarity of the temperature coefficient of the peak value of the output voltage from the detecting section, and the signal processing circuit may output the displacement signal indicative of the position data of the core relative to the detection coil based on the output from said amplifier. In this arrangement, the output from the amplifier is a signal which is merely dependent on displacement of the core after the temperature compensation. Accordingly, a displacement signal after the temperature compensation can be obtained by merely processing the output.

Preferably, the AC voltage generated from the oscillating circuit may include a chopping wave. In this arrangement, an AC voltage can be more easily obtained from the oscillating circuit than a voltage of a sinusoidal waveform.

Preferably, the AC outputted from the alternate constant current circuit may include a chopping wave. In this arrangement, an AC voltage can be more easily obtained from the alternate constant current circuit than a voltage of a sinusoidal waveform.

Preferably, the number of turns of a winding wire of the detection coil, the pitch of the winding wire, and the frequency of a signal outputted to the detection coil may be respectively set at such values that a temperature coefficient of an impedance component of the winding wire of the detection coil equals to a temperature coefficient of an impedance component of the detection coil due to relative displacement of the core to the detection coil. In this arrangement, a variation of the temperature characteristic of the impedance of the detection coil due to relative displacement of the core to the detection coil can be suppressed by controlling the impedance of the detection coil in the case where the core is not passed through the detection coil.

Preferably, the core may be made of such a material that a temperature coefficient of an impedance component of the winding wire of the detection coil equals to a temperature coefficient of an impedance component of the detection coil due to relative displacement of the core to the detection coil. This arrangement enables to obtain a similar effect as in the above.

Preferably, the core may be applied with such a surface treatment that a temperature coefficient of an impedance component of the winding wire of the detection coil equals to a temperature coefficient of an impedance component of the detection coil due to relative displacement of the core to the detection coil. This arrangement enables to obtain a similar effect as in the above.

Preferably, the core may have a surface at least made of a material having a small temperature characteristic in volume resistivity. This arrangement is effective in suppressing a variation of the temperature characteristic of the impedance of the detection coil in the case where the core is passed through the detection coil.

Preferably, the core may have the surface at least made of a material selected from the group consisting of nickel-chrome alloy, nickel-chrome-iron alloy, iron-chrome-aluminum alloy, copper-nickel alloy, and manganin. In this arrangement, at least the surface of the core can be easily made of the material having a small temperature coefficient in volume resistivity.

Preferably, the core may be made by cutting an electric heating wire into a wire segment of a certain length and by bending the wire segment into a certain shape. This arrangement is effective in further suppressing a variation of the temperature characteristic of the impedance of the detection coil in the case where the core is passed through the detection coil and in reducing loss of the material for the core.

Preferably, the electric heating wire may be made of a material selected from the group consisting of nickel-chrome alloy, nickel-chrome-iron alloy, iron-chrome-aluminum alloy, copper-nickel alloy, and manganin. In this arrangement, the core can be easily obtained by bending the electric heating wire segment of the desired length into an appropriate shape.

Preferably, a winding wire of the detection coil may be made of a material selected from the group consisting of nichrome, manganin, and copper-nickel alloy. This arrangement is effective in suppressing a variation of the temperature characteristic of the impedance of the detection coil in the case where the core is not passed through the detection coil.

Preferably, an end part of the core may have such a thickness as to facilitate passing of a magnetic flux than a remaining part of said core. In this arrangement, the end effect can be alleviated, and the displacement zone where desirable linearity of output is secured can be widened.

Preferably, the end part of the core may have a thickness larger than the remaining part of the core. This arrangement is advantageous in forming the core by metal injection molding. Also, this arrangement is effective in easily forming the core by joining two members together.

Preferably, the end part of the core may be made of a material having a higher magnetic permeability than the remaining part of the core. This arrangement is advantageous in securing mechanical stability because the thickness of the core can be made constant. Further, according to this arrangement, the core is easily producible by joining two members together.

Preferably, the end part of the core may be surface-treated with a material having a higher magnetic permeability than the remaining part of the core. This arrangement is advantageous in securing mechanical stability because the thickness of the core can be made constant. Also, the curved core is easily producible.

Preferably, the surface of the end part of the core may be made of an electromagnetic stainless applied with permalloy plating. This arrangement provides well-balanced magnetic permeability between the end part and the remaining part of the core as well as excellent resistance against corrosion.

Preferably, the core may have an end part produced by removing an edge thereof by chamfering. This arrangement is free from a drawback that the core is abutted against the inner wall of the bobbin, which is effective in keeping linearity from being lowered due to the abutment.

Preferably, the detection coil may have a curved shape having a predetermined curvature, and the position sensor may further comprise a housing including means for fixing the detection coil and correcting a variation of the curvature of the detection coil. This arrangement is effective in correcting and preventing variation of the curvature of the detection coil.

Preferably, the housing may correct the variation of the curvature of the detection coil by being brought into contact with at least a part of a radially inner portion of the detection coil. This arrangement is effective in securely correcting and preventing variation of the curvature of the detection coil.

Preferably, the position sensor may further comprise a bobbin on which the detection coil is wound, and the detection coil and the bobbin may be resin-molded before assembling. This arrangement is effective in preventing disconnection of the wire which may occur at the time of assembling and/or disconnection of wire due to application of vibration and/or impact. Further, this arrangement is effective in correcting and preventing variation of the curvature of the detection coil because the curved bobbin and the detection coil are resin-molded in a state that deformation of the curved bobbin is corrected even if the housing is not provided with means for correcting deformation of the curvature of the detection coil.

Preferably, the position sensor may further comprise two bobbins on each of which the detection coil is wound, and the two detection coils and the two bobbins may be integrally resin-molded before assembling. This arrangement is free from a positional displacement of the two detection coils and from a variation of output between the two detecting sections due to positional displacement of the two detection coils at the time of assembling, in addition to the aforementioned effect.

Preferably, the detection coil and the core each may be in the number of two, the two cores may be respectively passed through the two detection coils, and the two cores and the two detection coils may be integrally resin-molded. This arrangement enables to obtain a similar effect as in the above.

Preferably, the detection coil may include two detection coil members having a curvature identical to each other, the core may include two core members having a curvature identical to each other, the two core members may be passed through the two detection coil members respectively by being rotated about an axis of rotation of the core, and the two detection coil members may be laid one over the other in a direction of the axis of rotation of the core.

In the above arrangement, since a wide opening angle of the winding part on the detection coil and a wide mechanical rotating angle of the movable block can be secured, the range of rotating angle of the movable block where desirable linearity of impedance of the detection coil is secured can be widened. Furthermore, since the specifications of the two detection coil members are made identical to each other, the characteristics of the two detection coil members can be made identical to each other, which is advantageous in winding the wire and in suppressing production cost.

Preferably, the detection coil may include two curved detection coil members having a curvature different from each other, the core may include two curved core members having a curvature different from each other, the two core members may be passed through the two detection coil members respectively by being rotated about an axis of rotation of the core, and the two detection coil members may be arranged within a range of an angle of rotation identical to each other with respect to the axis of rotation of the core and on a plane identical to each other.

In the above arrangement, since a wide opening angle of the winding part on the detection coil and a wide mechanical rotating angle of the movable block can be secured, the range of rotating angle of the movable block where desirable linearity of impedance of the detection coil is secured can be widened. This is effective in producing a thin position sensor.

Preferably, the signal processing circuit may include a signal correcting circuit having an analog-to-digital converting circuit for converting the peak value of the output voltage from the detecting section into a digital signal, and a correcting circuit for digitally trimming the digital signal, and the displacement signal outputted from the signal processing circuit may include a digital signal having a bit number that satisfies resolution required for position detection.

The above arrangement is effective in eliminating the below-mentioned problem. In the case where the system (e.g. ECU) for processing an output from the position sensor is a digital circuit, redundant A/D conversion and D/A conversion are repeated if an output from the position sensor is an analog signal, with the result that a detection error may occur and a response delay may be accompanied. The arrangement is free from such a drawback since the output from the position sensor is digital output. Further, a digital signal is not liable to be affected by an external noise in signal transmission, compared with analog output. Furthermore, since the displacement signal includes a digital signal having a bit number that satisfies resolution required for position detection, the ECU can read out the data on real-time basis and can implement processing quickly.

Preferably, the signal processing circuit may include a signal correcting circuit having an analog-to-digital converting circuit for converting the peak value of the output voltage from the detecting section into a digital signal, and a correcting circuit for digitally trimming the digital signal, and the displacement signal outputted from the signal processing circuit may include an output initiate signal, and a pulse signal which is outputted upon lapse of a duration in correspondence to the position data after output of the output initiate signal.

The above arrangement is effective in eliminating the below-mentioned problem. In the case where the system (e.g. ECU) for processing an output from the position sensor is a digital circuit, redundant A/D conversion and D/A conversion are repeated if an output from the position sensor is an analog signal, with the result that a detection error may occur and a response delay may be accompanied. The arrangement is free from such a drawback since the output from the position sensor is digital output. Further, a digital signal is not liable to be affected by an external noise in signal transmission, compared with analog output. This arrangement is advantageous because the system can be configured with a single signal line.

Preferably, the signal processing circuit may include a signal correcting circuit having an analog-to-digital converting circuit for converting the peak value of the output voltage from the detecting section into a digital signal, and a correcting circuit for digitally trimming the digital signal, and the displacement signal outputted from the signal processing circuit may include an output initiate signal, and a pulse signal having a duty ratio in correspondence to the position data. The pulse signal is outputted following the output initiate signal. This arrangement enables to obtain a similar effect as in the above.

Preferably, the signal processing circuit may include a signal correcting circuit having an analog-to-digital converting circuit for converting the peak value of the output voltage from the detecting section into a digital signal, and a correcting circuit for digitally trimming the digital signal, and the displacement signal outputted from the signal processing circuit includes an output initiate signal, and a pulse signal having a pulse width in correspondence to the position data. The pulse signal is outputted following the output initiate signal. This arrangement enables to obtain a similar effect as in the above.

Preferably, the signal processing circuit may include a signal correcting circuit having an analog-to-digital converting circuit for converting the peak value of the output voltage from the detecting section into a digital signal, and a correcting circuit for digitally trimming the digital signal, and the displacement signal outputted from the signal processing circuit may include an output initiate signal, and a certain number of pulse signals in correspondence to the position data. The pulse signals are outputted following the output initiate signal. This arrangement enables to obtain a similar effect as in the above.

Preferably, the detection coil may include two detection coil members, and the two detection coil members may commonly use the core which is attached to a structural member. This arrangement is effective in suppressing cost rise accompanied by providing the double-layered detecting section.

Preferably, the detection coil may include two detection coil members, and the constant current circuit may output a constant current having a given frequency and a given amplitude to the two detection coil members. This arrangement is also effective in suppressing cost rise accompanied by providing the double-layered detecting section.

Preferably, the respective circuits may constitute an active circuit, and the active circuit may include a monolithic integrated circuit. This arrangement is also effective in suppressing cost rise accompanied by providing the double-layered detecting section. Particularly, since the integrated circuit is a most expensive part, this arrangement provides remarkable advantage owing to common use of the circuit.

EXPLOITATION IN INDUSTRY

As mentioned above, according to this invention, provided is a position sensor that enables to compensate for a variation of a temperature coefficient of an impedance of a detection coil due to displacement of a core relative to the coil with a simplified circuit configuration. The inventive position sensor is optimally applicable to a position sensor for detecting the angle of an acceleration pedal in an automobile, a position sensor for use in a plant such as a power-generation facility, a position sensor for detecting the angle of a pedal in a motorized bicycle, or its equivalent.

What is claimed is:

1. A position sensor comprising:
    a constant current circuit for outputting a constant current which is obtained by superposing an alternate current having a given frequency and a given amplitude over a direct current having a given amplitude;
    a detecting section including at least a detection coil to which said constant current is supplied;
    a core made of a magnetic material, said core being displaced relative to said detection coil in an axial direction of said detection coil; and
    a signal processing circuit for outputting a displacement signal indicative of position data of said core relative to said detection coil based on a peak value of an output voltage from said detecting section upon supply of said constant current, wherein
    at least one of a ratio of the direct current to the alternate current of said constant current, a ratio of an alternate current component to a direct current component of an impedance in said detecting section, a temperature characteristic of the ratio of the direct current to the alternate current of said constant current, and a temperature characteristic of the ratio of the alternate current component to the direct current component of the impedance in said detecting section is set in such a manner that a margin of fluctuation of a temperature coefficient of the peak value of the output voltage from said detecting section in a whole displacement zone of said core relative to said detection coil is smaller than a margin of fluctuation of a temperature coefficient of the alternate current component of the impedance in said detecting section at said given frequency in the whole displacement zone of said core relative to said detection coil.

2. The position sensor according to claim 1, wherein said core is operative to pass through a winding wire of said detection coil.

3. The position sensor according to claim 1, wherein a temperature coefficient of a direct current component of the output voltage from said detecting section is closer to a temperature coefficient of an alternate current component of the output voltage from said detecting section in the case where a passing amount of said core through a winding wire of said detection coil is maximal than the temperature coefficient of the alternate current component of the output voltage from said detecting section in the case where the passing amount of said core is minimal.

4. The position sensor according to claim 1, wherein
    said constant current circuit includes an oscillating circuit for generating a voltage which is obtained by superposing an alternate-current voltage having a given frequency and a given amplitude over a direct-current voltage having a given amplitude, and a voltage-current converting circuit for converting the output voltage from said oscillating circuit into a current, and
    the ratio of the direct current to the alternate current of said constant current is set by setting said direct-current voltage and said alternate-current voltage individually.

5. The position sensor according to claim 4, wherein the alternate-current voltage generated from said oscillating circuit includes a chopping wave.

6. The position sensor according to claim 1, wherein
    said constant current circuit includes an oscillating circuit for generating a voltage which is obtained by superposing an alternate-current voltage having a given frequency and a given amplitude over a direct-current voltage having a given amplitude, and a voltage-current converting circuit for converting the output voltage from said oscillating circuit into a current, and
    the temperature characteristic of the ratio of the direct current to the alternate current of said constant current is set by setting a temperature coefficient of a value of a resistance provided in said oscillating circuit, the resistance determining a value of the direct-current voltage.

7. The position sensor according to claim 1, wherein
    said constant current circuit includes an oscillating circuit for generating a voltage which is obtained by superposing an alternate-current voltage having a given frequency and a given amplitude over a direct-current voltage having a given amplitude, and a voltage-current converting circuit for converting the output voltage from said oscillating circuit into a current, and
    the temperature characteristic of the ratio of the alternate current component to the direct current component of the impedance in said detecting section is set by setting a temperature coefficient of the frequency of said alternate-current voltage.

8. The position sensor according to claim 1, wherein
    said constant current circuit includes a direct constant current circuit for outputting a direct current having a given amplitude, and an alternate current circuit for outputting an alternate current having a given frequency and a given amplitude, and
    at least one of the ratio of the direct current to the alternate current of said constant current, the ratio of the alternate current component to the direct current component of the impedance in said detecting section, the temperature characteristic of the ratio of the direct current to the alternate current of said constant current, and the temperature characteristic of the ratio of the alternate current component to the direct current component of the impedance in said detecting section is set by setting at least one of a temperature characteristic of the amplitude of said direct current, a temperature characteristic of the frequency of said alternate current, and a temperature characteristic of the amplitude of said alternate current.

9. The position sensor according to claim 8, wherein the alternate current outputted from said alternate constant current circuit includes a chopping wave.

10. The position sensor according to claim 1, wherein
said detecting section includes said detection coil, and a circuit element which is connected in series with said detection coil and has an impedance free from displacement of said core, said signal processing circuit outputs the displacement signal indicative of the position data of said core relative to said detection coil based on a peak value of a voltage which is detected at both ends of the series circuit including said detection coil and the circuit element upon supply of said constant current to said detection coil, and at least one of the ratio of the alternate current component to the direct current component of the impedance in said detecting section, and the temperature characteristic of the ratio of the alternate current component to the direct current component of the impedance in said detecting section is set by setting at least one of an alternate current component, and a direct current component of the impedance of said circuit element, and respective temperature coefficients of the alternate current component and the direct current component of the impedance of said circuit element.

11. The position sensor according to claim 10, wherein said circuit element includes a resistance.

12. The position sensor according to claim 10, wherein said circuit element includes an inductor.

13. The position sensor according to claim 1, wherein
said constant current circuit includes an integrated circuit having resistances for setting the amplitude of said direct current, the frequency and the amplitude of said alternate current, and digital trimming means for setting the values of said resistances, and at least one of the ratio of the direct current to the alternate current of said constant current, the ratio of the alternate current component to the direct current component of the impedance in said detecting section, the temperature characteristic of the ratio of the direct current to the alternate current of said constant current, and the temperature characteristic of the ratio of the alternate current component to the direct current component of the impedance in said detecting section is set by setting the value of said resistance by said digital trimming means.

14. The position sensor according to claim 1, wherein said signal processing circuit includes a rectifying circuit, and a peak-holding circuit for peak-holding an output from said rectifying circuit.

15. The position sensor according to claim 1, wherein said signal processing circuit includes an amplifier having a temperature coefficient of a polarity opposite to a polarity of the temperature coefficient of the peak value of the output voltage from said detecting section, said signal processing circuit outputting the displacement signal indicative of the position data of said core relative to said detection coil based on the output from said amplifier.

16. The position sensor according to claim 1, wherein the number of turns of a winding wire of said detection coil, the pitch of the winding wire, and the frequency of a signal outputted to said detection coil are respectively set at such values that a temperature coefficient of an impedance component of the winding wire of said detection coil equals to a temperature coefficient of an impedance component of said detection coil due to relative displacement of said core to said detection coil.

17. The position sensor according to claim 1, wherein said core is made of such a material that a temperature coefficient of an impedance component of the winding wire of said detection coil equals to a temperature coefficient of an impedance component of said detection coil due to relative displacement of said core to said detection coil.

18. The position sensor according to claim 1, wherein the core is applied with such a surface treatment that a temperature coefficient of an impedance component of the winding wire of said detection coil equals to a temperature coefficient of an impedance component of said detection coil due to relative displacement of said core to said detection coil.

19. The position sensor according to claim 1, wherein said core has a surface at least made of a material having a small temperature coefficient in volume resistivity.

20. The position sensor according to claim 19, wherein said core has the surface at least made of a material selected from the group consisting of nickel-chrome alloy, nickel-chrome-iron alloy, iron-chrome-aluminum alloy, copper-nickel alloy, and manganin.

21. The position sensor according to claim 19, wherein said core is made by cutting an electric heating wire into a wire segment of a certain length and by bending the wire segment into a certain shape.

22. The position sensor according to claim 21, wherein said electric heating wire is made of a material selected from the group consisting of nickel-chrome alloy, nickel-chrome-iron alloy, iron-chrome-aluminum alloy, copper-nickel alloy, and manganin.

23. The position sensor according to claim 1, wherein a winding wire of said detection coil is made of a material selected from the group consisting of nichrome, manganin, and copper-nickel alloy.

24. The position sensor according to claim 1, wherein an end part of said core has such a thickness as to facilitate passing of a magnetic flux than a remaining part of said core.

25. The position sensor according to claim 24, wherein the end part of said core has a thickness larger than the remaining part of said core.

26. The position sensor according to claim 24, wherein the end part of said core is made of a material having a higher magnetic permeability than the remaining part of said core.

27. The position sensor according to claim 24, wherein the end part of said core is surface-treated with a material having a higher magnetic permeability than the remaining part of said core.

28. The position sensor according to claim 27, wherein the surface of the end part of said core is made of an electromagnetic stainless applied with permalloy plating.

29. The position sensor according to claim 1, wherein said core has an end part produced by removing an edge thereof by chamfering.

30. The position sensor according to claim 1, wherein said detection coil has a curved shape having a predetermined curvature, the position sensor further comprising a housing including means for fixing said detection coil and correcting a variation of the curvature of said detection coil.

31. The position sensor according to claim 30, wherein said housing corrects the variation of the curvature of said detection coil by being brought into contact with at least a part of a radially inner portion of said detection coil.

32. The position sensor according to claim 1, further comprising a bobbin on which said detection coil is wound, said detection coil and said bobbin being resin-molded before assembling.

33. The position sensor according to claim 1, further comprising two bobbins on each of which said detection coil is wound, said two detection coils and said two bobbins being integrally resin-molded before assembling.

34. The position sensor according to claim 1, wherein said detection coil and said core each is in the number of two, said two cores are respectively passed through said two detection coils, and said two cores and said two detection coils are integrally resin-molded.

35. The position sensor according to claim 1, wherein said detection coil includes two detection coil members having a curvature identical to each other, said core includes two core members having a curvature identical to each other, said two core members being passed through said two detection coil members respectively by being rotated about an axis of rotation of said core, and said two detection coil members are laid one over the other in a direction of the axis of rotation of said core.

36. The position sensor according to claim 1, wherein said detection coil includes two curved detection coil members having a curvature different from each other, said core includes two curved core members having a curvature different from each other, said two core members being passed through said two detection coil members respectively by being rotated about an axis of rotation of said core, and said two detection coil members are arranged within a range of an angle of rotation identical to each other with respect to the axis of rotation of said core and on a plane identical to each other.

37. The position sensor according to claim 1, wherein said signal processing circuit includes a signal correcting circuit having an analog-to-digital converting circuit for converting the peak value of the output voltage from said detecting section into a digital signal, and a correcting circuit for digitally trimming said digital signal, and said displacement signal outputted from said signal processing circuit includes a digital signal having a bit number that satisfies resolution required for position detection.

38. The position sensor according to claim 1, wherein said signal processing circuit includes a signal correcting circuit having an analog-to-digital converting circuit for converting the peak value of the output voltage from said detecting section into a digital signal, and a correcting circuit for digitally trimming said digital signal, and said displacement signal outputted from said signal processing circuit includes an output initiate signal, and a pulse signal which is outputted upon lapse of a duration in correspondence to said position data after output of said output initiate signal.

39. The position sensor according to claim 1, wherein said signal processing circuit includes a signal correcting circuit having an analog-to-digital converting circuit for converting the peak value of the output voltage from said detecting section into a digital signal, and a correcting circuit for digitally trimming said digital signal, and said displacement signal outputted from said signal processing circuit includes an output initiate signal, and a pulse signal having a duty ratio in correspondence to said position data, said pulse signal being outputted following said output initiate signal.

40. The position sensor according to claim 1, wherein said signal processing circuit includes a signal correcting circuit having an analog-to-digital converting circuit for converting the peak value of the output voltage from said detecting section into a digital signal, and a correcting circuit for digitally trimming said digital signal, and said displacement signal outputted from said signal processing circuit includes an output initiate signal, and a pulse signal having a pulse width in correspondence to said position data, said pulse signal being outputted following said output initiate signal.

41. The position sensor according to claim 1, wherein said signal processing circuit includes a signal correcting circuit having an analog-to-digital converting circuit for converting the peak value of the output voltage from said detecting section into a digital signal, and a correcting circuit for digitally trimming said digital signal, and said displacement signal outputted from said signal processing circuit includes an output initiate signal, and a certain number of pulse signals in correspondence to said position data, said pulse signals being outputted following said output initiate signal.

42. The position sensor according to claim 1, wherein said detection coil includes two detection coil members, and said two detection coil members commonly use said core which is attached to a structural member.

43. The position sensor according to claim 1, wherein said detection coil includes two detection coil members, and said constant current circuit outputs a constant current having a given frequency and a given amplitude to said two detection coil members.

44. The position sensor according to claim 43, wherein said respective circuits constitute an active circuit, and said active circuit includes a monolithic integrated circuit.

* * * * *